United States Patent [19]

Ogino et al.

[11] Patent Number: 4,786,820
[45] Date of Patent: Nov. 22, 1988

[54] APPARATUS FOR PARALLEL-PROCESSING IMAGE DATA

[75] Inventors: Yoshitaka Ogino, Kawasaki; Hiroshi Tanioka, Tokyo, both of Japan

[73] Assignee: Canon Kabushiki Kaisha, Tokyo, Japan

[21] Appl. No.: 147,091

[22] Filed: Jan. 20, 1988

Related U.S. Application Data

[63] Continuation of Ser. No. 807,662, Dec. 11, 1985, abandoned.

[30] Foreign Application Priority Data

Dec. 14, 1984 [JP] Japan .................................. 59-262888

[51] Int. Cl.[4] .............................................. H04N 3/14
[52] U.S. Cl. ................................. 250/578; 358/213.22
[58] Field of Search .................... 250/578; 357/30–32; 358/213.22, 213.25

[56] References Cited

U.S. PATENT DOCUMENTS

| | | | |
|---|---|---|---|
| 3,995,107 | 11/1976 | Woywood | 358/213 |
| 4,222,105 | 9/1980 | Shimizu et al. | 364/518 |
| 4,513,313 | 4/1985 | Kinoshita et al. | 358/213 |
| 4,584,609 | 4/1986 | Klein et al. | 358/213 |
| 4,589,034 | 5/1986 | Yokomizo | 358/234 |

Primary Examiner—David C. Nelms
Assistant Examiner—Stephone B. Allen
Attorney, Agent, or Firm—Fitzpatrick, Cella, Harper & Scinto

[57] ABSTRACT

An image processing apparatus comprises image output means for outputting image information for each one line, a plurality of image processing means for divisionally receiving the image information of one line as an input and parallel-processing the image information, and converting means for converting the result of the processing of the image processing means from parallel into series.

11 Claims, 23 Drawing Sheets

|  | 1 | 2 | 3 | 4 | 5 | 6 | 7 | 8 |
|---:|---|---|---|---|---|---|---|---|
| RES REG : | | | | | | | | |
| max REG : | | | | | | | | |
| min REG : | | | | | | | | |
| THRESHOLD REG : | | | | | | | | |
| X COUNTER : | | | | | | | | |
| Y COUNTER : | | | | | | | | |
| W COUNTER : | | | | | | | | |
| BLC COUNTER : | | | | | | | | |
| C REG : | | | | | | | | |

F/FL FLAG
F/OUT FLAG

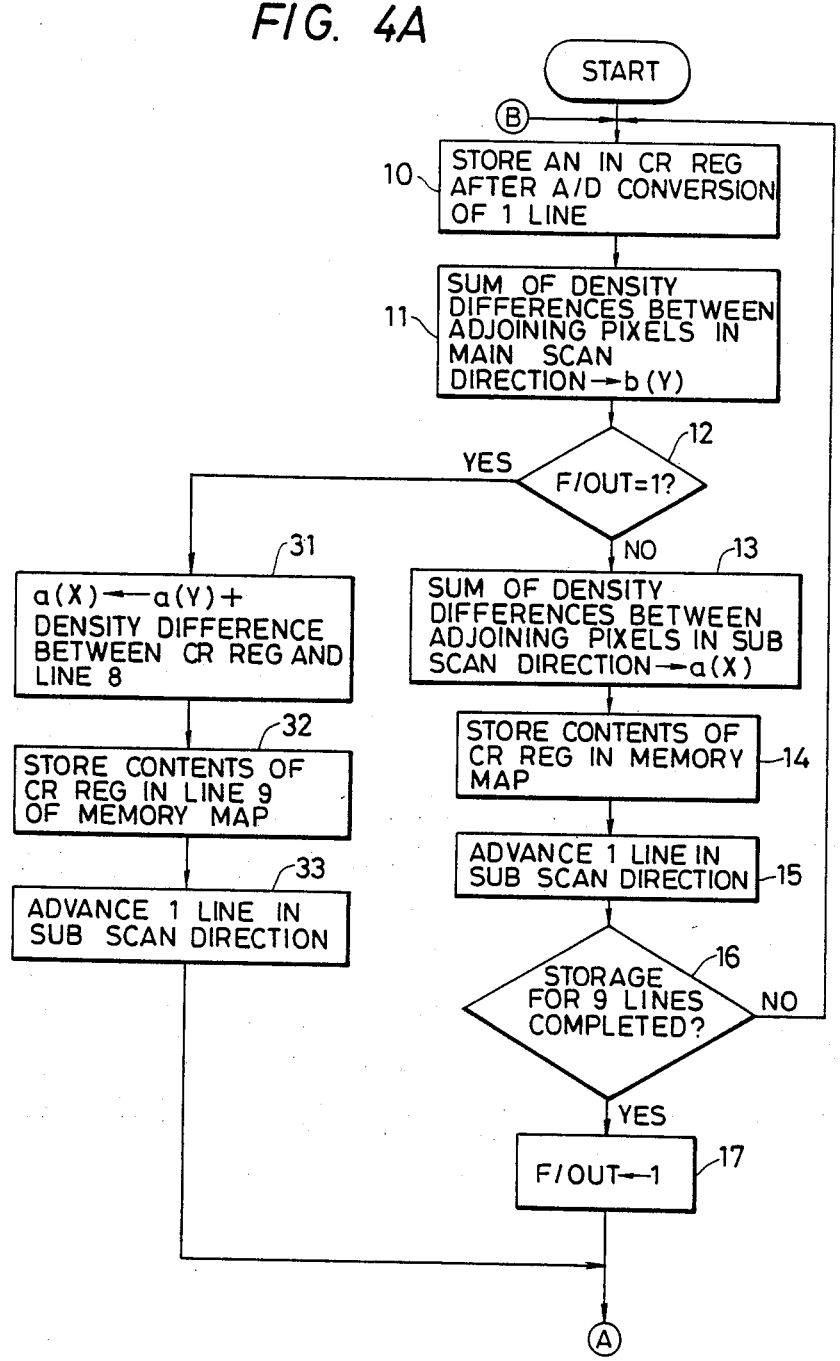

| 32 | 24 | 22 | 28 | 34 | 42 | 44 | 38 |
|----|----|----|----|----|----|----|----|
| 10 | 8  | 6  | 20 | 56 | 58 | 60 | 46 |
| 12 | 2  | 4  | 18 | 54 | 62 | 62 | 48 |
| 26 | 14 | 16 | 30 | 40 | 52 | 50 | 36 |
| 34 | 42 | 44 | 38 | 32 | 24 | 22 | 28 |
| 56 | 58 | 60 | 46 | 10 | 8  | 6  | 20 |
| 54 | 62 | 62 | 48 | 12 | 2  | 4  | 18 |
| 40 | 52 | 50 | 36 | 26 | 14 | 16 | 30 |

| 58 | 50 | 54 | 62 | 60 | 52 | 56 | 62 |
|----|----|----|----|----|----|----|----|
| 14 | 2  | 6  | 10 | 16 | 4  | 8  | 12 |
| 30 | 18 | 22 | 26 | 32 | 20 | 24 | 28 |
| 42 | 34 | 38 | 46 | 44 | 36 | 40 | 48 |
| 60 | 52 | 56 | 62 | 58 | 50 | 54 | 62 |
| 16 | 4  | 8  | 12 | 14 | 2  | 6  | 10 |
| 32 | 20 | 24 | 28 | 30 | 18 | 22 | 26 |
| 44 | 36 | 40 | 48 | 42 | 34 | 38 | 46 |

| 28 | 30 | 32 | 34 | 28 | 30 | 32 | 34 |
|----|----|----|----|----|----|----|----|
| 26 | 16 | 18 | 36 | 26 | 16 | 18 | 36 |
| 24 | 22 | 20 | 38 | 24 | 22 | 20 | 38 |
| 48 | 44 | 42 | 40 | 48 | 44 | 42 | 40 |
| 28 | 30 | 32 | 34 | 28 | 30 | 32 | 34 |
| 26 | 16 | 18 | 36 | 26 | 16 | 18 | 36 |
| 24 | 22 | 20 | 38 | 24 | 22 | 20 | 38 |
| 48 | 44 | 42 | 40 | 48 | 44 | 42 | 40 |

FIG. 7D

| 32 | 32 | 32 | 32 | 32 | 32 | 32 | 32 |
|----|----|----|----|----|----|----|----|
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |

| 28 | 30 | 32 | 34 | 28 | 30 | 32 | 34 |
|----|----|----|----|----|----|----|----|
| 26 | 16 | 18 | 36 | 26 | 16 | 18 | 36 |
| 24 | 22 | 20 | 38 | 24 | 22 | 20 | 38 |
| 48 | 44 | 42 | 40 | 48 | 44 | 42 | 40 |
| 28 | 30 | 32 | 34 | 28 | 30 | 32 | 34 |
| 26 | 16 | 18 | 36 | 26 | 16 | 18 | 36 |
| 24 | 22 | 20 | 38 | 24 | 22 | 20 | 38 |
| 48 | 44 | 42 | 40 | 48 | 44 | 42 | 40 |

| 20 | 36 | 20 | 36 | 20 | 36 | 20 | 36 |
|----|----|----|----|----|----|----|----|
| 44 | 28 | 44 | 28 | 44 | 28 | 44 | 28 |
| 20 | 36 | 20 | 36 | 20 | 36 | 20 | 36 |
| 44 | 28 | 44 | 28 | 44 | 28 | 44 | 28 |
| 20 | 36 | 20 | 36 | 20 | 36 | 20 | 36 |
| 44 | 28 | 44 | 28 | 44 | 28 | 44 | 28 |
| 20 | 36 | 20 | 36 | 20 | 36 | 20 | 36 |
| 44 | 28 | 44 | 28 | 44 | 28 | 44 | 28 |

| 20 | 44 | 20 | 44 | 20 | 44 | 20 | 44 |
|----|----|----|----|----|----|----|----|
| 36 | 28 | 36 | 28 | 36 | 28 | 36 | 28 |
| 20 | 44 | 20 | 44 | 20 | 44 | 20 | 44 |
| 36 | 28 | 36 | 28 | 36 | 28 | 36 | 28 |
| 20 | 44 | 20 | 44 | 20 | 44 | 20 | 44 |
| 36 | 28 | 36 | 28 | 36 | 28 | 36 | 28 |
| 20 | 44 | 20 | 44 | 20 | 44 | 20 | 44 |
| 36 | 28 | 36 | 28 | 36 | 28 | 36 | 28 |

| 28 | 44 | 28 | 44 | 28 | 44 | 28 | 44 |
|----|----|----|----|----|----|----|----|
| 36 | 20 | 36 | 20 | 36 | 20 | 36 | 20 |
| 28 | 44 | 28 | 44 | 28 | 44 | 28 | 44 |
| 36 | 20 | 36 | 20 | 36 | 20 | 36 | 20 |
| 28 | 44 | 28 | 44 | 28 | 44 | 28 | 44 |
| 36 | 20 | 36 | 20 | 36 | 20 | 36 | 20 |
| 28 | 44 | 28 | 44 | 28 | 44 | 28 | 44 |
| 36 | 20 | 36 | 20 | 36 | 20 | 36 | 20 |

BL 8

APPARATUS FOR PARALLEL-PROCESSING IMAGE DATA

This application is a continuation of application Ser. No. 807,662 filed Dec. 11, 1985, now abandoned.

BACKGROUND OF THE INVENTION

1. Field of the Invention

This invention relates to an image processing apparatus such as a copying apparatus or a facsimile apparatus, and in particular to an image processing apparatus which effects parallel-processing by a plurality of image processing means.

2. Description of the Prior Art

Heretofore, in an apparatus of this type, an image has been raster-scanned and read by a CCD or the like and has been subjected to image processing such as a binarizing process or tone processing. Recently, however, it has been proposed as the processing of this type to recognize the tone of the image on real time and selectively change over a processing suitable for the image tone to thereby reproduce the image.

However, in the digital copying apparatus according to the prior art, where an original is expressed in half tone like a photograph, dither processing is effected by the use of a process selecting key in accordance with the kind of the original, and if the original is a character original, a slice binarizing process by a predetermined threshold value is effected and thus, only the same processing has been effected for the entire area of the original.

On the other hand, if the image tone is discriminated on each area for an original comprising a mixture of characters and photographs, image reproduction faithful to the original will become possible by changing over the processing even in the same original. However, in spite of numerous techniques having already been proposed regarding the processing system of this type, they are all based on the two-dimensional information of the image with a desired pixel as the center. To accomplish said image tone recognition, means for storing therein the image information obtained by raster-scanning the image over at least two lines is indispensable and therefore, the scale of the circuit becomes bulky and accordingly, compactness of the apparatus has been desired.

Also, the processing algorism is complicated to discriminate accurately and accordingly, taking the scale of the circuit or the processing speed into consideration where the apparatus is constituted by hardware, the apparatus is not yet practical to such a degree that it is applicable to a versatile copying apparatus.

SUMMARY OF THE INVENTION

It is an object of the present invention to eliminate the above-noted disadvantages peculiar to the prior art.

It is another object of the present invention to provide an image processing apparatus which is capable of accomplishing high-speed two-dimensional image processing.

More particularly, it is an object of the present invention to provide an image processing apparatus which is made high in image processing speed and compact in size by parallel-processing the image input information in each block.

It is still another object of the present invention to provide an image processing apparatus which has image processing means for dividing and parallel-processing an input image signal and which does not cause the non-conformity of image processing between adjacent image processing means to occur.

Still more particularly, it is an object of the present invention to provide an image processing apparatus in which, by inputting the data of a pixel to be processed by another image processing means adjacent to an image processing means, the image processing between the image processing means is endowed with conformity.

Other objects of the present invention will become apparent from the following detailed description taken in conjunction with the accompanying drawings.

BRIEF DESCRIPTION OF THE DRAWINGS

FIGS. 7A, 7B, 7C, 7D, 7E, 7F, 7G and 7H show threshold matrices for binarization.

DESCRIPTION OF THE PREFERRED EMBODIMENTS

First, the features of the present embodiment are:

(1) Parallel image processing is effected by the use of a plurality of 1-chip image processing microcomputers (hereinafter referred to as CPUs);

(2) The partial charge of each CPU is allotted so that the output of a one-to-one magnification type line sensor cell is divided into a plurality of blocks and the cell output of each block is parallel-input to the A/D conversion input ports of said CPUs;

(3) In order to eliminate the non-conformity of processing occurring between adjacent CPUs, boundary cell information is overlappingly introduced into adjacent CPUs and image processing is effected; and (4) The one-to-one magnification type line sensor and the processing CPUs are arranged on the same base plate.

A preferred embodiment of the present invention will hereinafter be described in detail with reference to the drawings.

Figure 1:
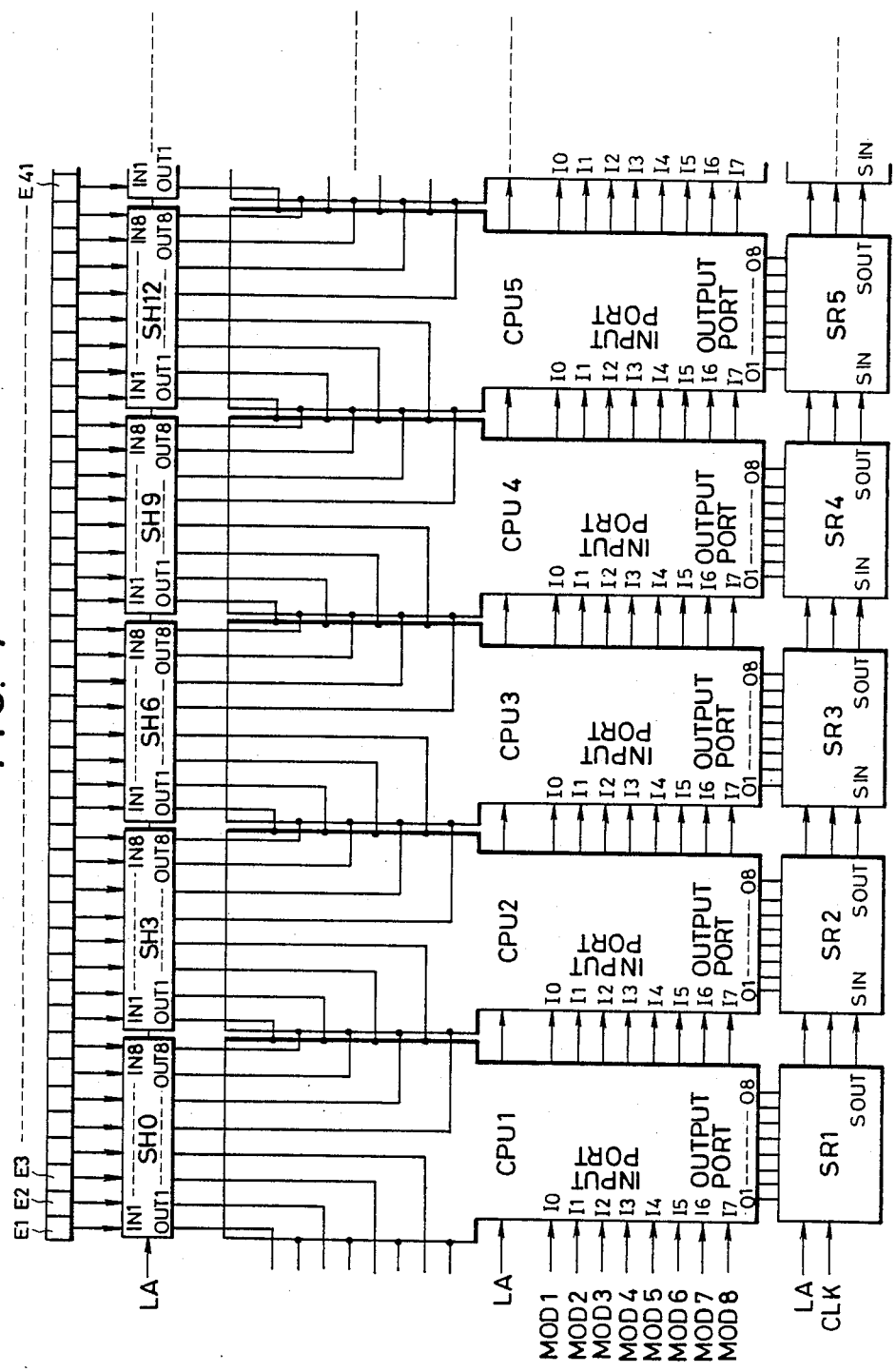
FIG. 1 is a block diagram showing an embodiment of the present invention and illustrating the wiring of each construction.

FIG. 1 is a block diagram of an embodiment of the image processing apparatus of the present invention.

The components of each block are a sensor cell, a sampling and holding circuit, the CPU, a shift register, etc. Each component will now be described.

In FIG. 1, E1, E2, ..., E41 designate a group of sensor cells arranged in the form of a line. In the present embodiment, each sensor cell is of the thin film type which comprises amorphous silicon and has a characteristic that the resistance value thereof varies in conformity with the quantity of light. If an area provided with a light-intercepting mask is connected in series with each cell area and a power source is connected to the opposite ends to thereby detect any potential change at the junction between two areas, the quantity of light received by the cell area can be known. The construction of the sensors can likewise by realized by the use of the type which produces an electromotive force in accordance with the quantity of light.

The outputs of the sensors of this type, from the viewpoint of their high output impedance or their responsiveness, can be connected at one-to-one rate to the A/D input ports of CPU1, CPU2, CPU3, ... through sampling and holding circuits SH0, SH3, ... (which are not necessary in principle). In the conventional one-to-one magnification type sensor, an analog signal is serially transferred over a long distance and therefore, in spite of the high-speed responsiveness of the cell itself, high-speed reading has been impossible, but by using, for example, only the photodiode portion of the one-to-one magnification type CCD sensor of the present embodiment, the time required for the serial transfer becomes unnecessary and high-speed reading becomes possible.

An original is illuminated by a linear light source such as a fluorescent lamp or an LED, the image of the original is formed on a sensor row by a one-to-one imaging optical system such as Celfoc, and the sensors and the original are sub-scanned by conventional scanning means for moving the sensors and the original relative to each other in a direction perpendicular to the direction of arrangement of cells. By sampling and holding by a signal of a predetermined period put out from said scanning means (for example, in the present embodiment, the signal LA of FIG. 1 input at a period of 400 μsec.), divided image information can be read one line by one line by the CPU at a time. Also, the sampling and holding circuits (SH), CPUs and shift registers (SR) may respectively be of the same type and therefore, a number of them can be disposed on the same base plate, and this contributes to the compactness of the apparatus. Further, the distance from the sensor cell to the A/D conversion becomes shortest and therefore, image reading of a good S/N ratio and high reliability becomes possible.

The image tone recognition/image processing effected by each CPU during one input cycle (400 μsec.) is for only eight pixels as will later be described, and the burden allotted to a CPU for the image processing is small and therefore, even considerably complicated processing (which will later be described) becomes possible within a short time and further, real time image processing also becomes possible by microcomputerizing the CPUs and executing microcodes.

In the image processing apparatus according to the present embodiment, image tone discrimination is effected and a binarizing process is effected during said cycle. The binarized image signals are put out from the output ports 01-08 (FIGS. 1 and 2) of the CPUs, are parallel-latched by concatenately coupled (series-connected) shift registers SR1, SR2, ... (FIG. 1) and are successively put out is serial binary signals to a printer or the like by a high-speed clock CLK.

Now, in FIG. 1, the information corresponding to one line is divided by eight pixel units and one unit thereof is divisionally allotted to each CPU and therefore, if continuous two-dimensional processing of the image signal is effected, there may arise non-conformity of image processing between adjacent CPUs as will hereinafter be described.

That is, if attention is paid to the cell information of cell E8 in charge of CPU 1 and the process of folding up a desired pixel by the use of a mask comprised of 3×3 pixels (for example, 3×3 edge emphasizing or the like) is taken as an example of the aforementioned two-dimensional processing, CPU 1 further requires the cell information of cells E7, E9, etc. in order to process the cell information of cell E8 in the above-described manner. Particularly, the cell information of cell E9 in charge of CPU 2 becomes necessary. Likewise, during the processing of CPU 2 for which cell E9 is a desired pixel, the information of cell E8 becomes necessary.

So, in the present embodiment, allotment of pixels is effected in the following manner and the pixel input by each CPU is determined. If the size of the mask applied to image tone recognition or image processing is (2n+1)×(2n+1), each CPU is designed to further input n pieces of cell information out of the cell information in charge of two adjacent CPUs. Also, dividing the cell information of one line into how many blocks is determined by how many CPUs take charge of one line. So, in the CPUs of the present embodiment shown in FIGS. 1 and 2, the size of the mask (matrix) for effecting image tone recognition is 9×9 and the input capacity of each CPU is, for example, sixteen pixels, and therefore, the output of each sensor cell is divided into eight pixels and each CPU is caused to take charge of this 8-pixel cell information and further, of this 8-pixel information, the first 4-pixel cell information and the last 4-pixel cell information are also input to two adjacent CPUs. Of course, 4-pixel cell information is input from the two adjacent CPUs also to said CPU.

If the number of pixels to be image-processed by each CPU is 32, in order to enable two-dimensional image processing up to 9×9, a CPU capable of inputting 4×2+32=40 pixels is most practical and seems to be useful to reduce the number of CPUs, but in the following description, a CPU of 16-pixel input will be described.

Figure 2:
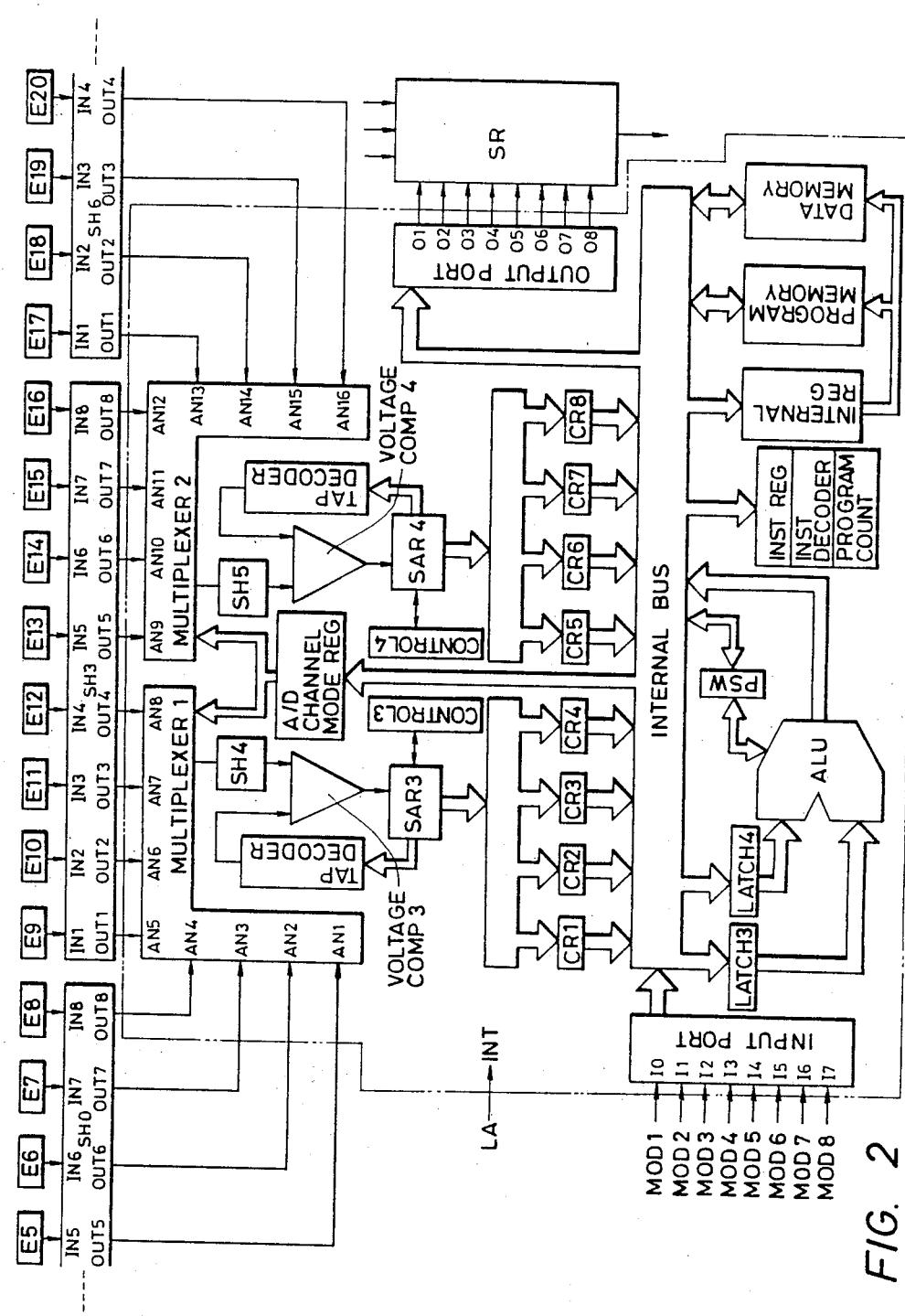
FIG. 2 is a block diagram showing the internal construction of the CPU in image processing means.

To each CPU, as shown in FIG. 2, 8 pixels out of the pixels to be processed by that CPU and 4 pixels from each of two adjacent CPUs are further input. For example, for the leftmost pixel E9 of CPU 2, the pixel information from E8, E7, E6 and E5 is input, each likewise, for the rightmost pixel E16, the pixel information from E17, E18, E19 and E20 is input. That is, 16 pixels of E5-E20 are input to CPU 2 to process 8 pixels of E9-E16.

By the above-described construction, the two-dimensional image processing based on 9×9 image information encircling the desired pixel becomes possible in principle and further, highly accurate processing becomes possible also for the pixel positioned near and between two adjacent CPUs without the continuity thereof being lost.

However, where a number of CPUs are actually mounted on a print base plate, the wiring method therefor greatly affects the density of actual mounting. So, the connection between the above-described sensor cells and the CPU chips will now be described.

The example of the connection shown in FIG. 1 is an example of the case where the density of cell arrangement is equal to the density of CPU input port terminals, and where as described above, connection is overlappingly made to each cell (where the density of CPU input port terminals is higher than the pattern density), input terminals are disposed on the opposing sides of adjacent CPU chips by the use of a chip carrier or the like, and a pattern is formed so that the opposing terminals of the two adjacent chips are "staggeredly" arranged, whereby connection is constructed by the high-density actual mounting by three surfaces. Where the density of CPU input port terminals is low as compared with the density of cell arrangement, the connection by only one surface of each chip is of course possible.

Figure 6A:
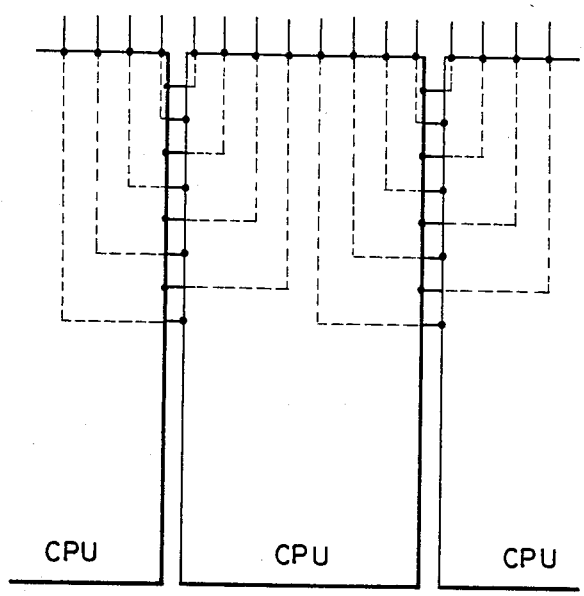
FIGS. 6A, 6B, 6C and 6D show methods of wiring on a base plate.
Figure 6B:
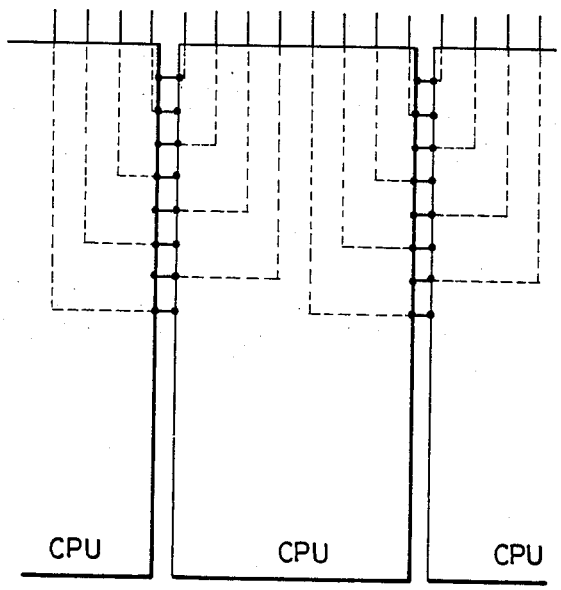
Figure 6C:
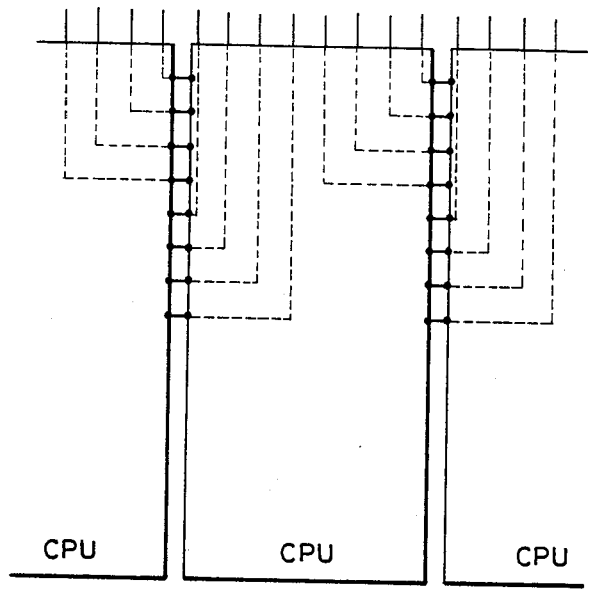
Figure 6D:
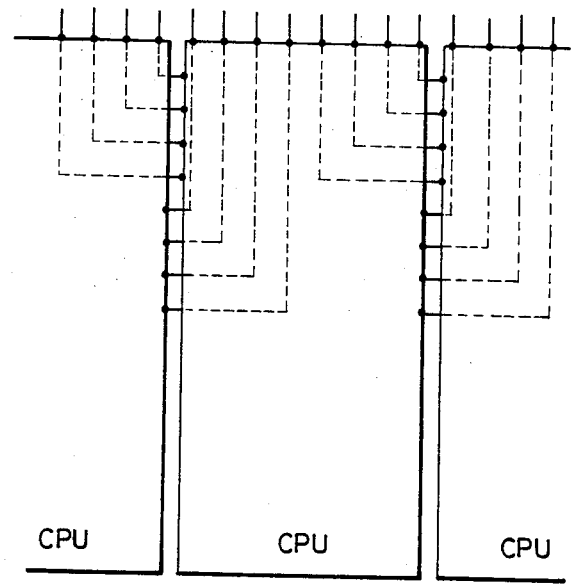

As other connecting method, there are connecting methods shown in FIGS. 6A to 6D. The connecting method of FIG. 6A is the same as the connecting method of FIG. 1. In FIGS. 6A to 6D, attention is paid to the input wiring from the sampling and holding circuit (SH) to CPUs. That is, FIGS. 6A and 6D show the wiring when use is made of a QIP (Quad Inline Package) type IC package or chip carrier. In these Figures, dots at the points of intersection between the IC package and the wiring are input terminals and show that input is effected therefrom into IC chips. Also, dotted lines show that the wiring on the print wiring base plate is hidden by the IC package or the like. For example, if a number of CPUs are actually mounted on a ceramic multichip base plate having a great thickness as shown in FIGS. 6A to 6D, the wiring will not intersect and actual mounting of high density will become possible.

The CPU will now be described. FIG. 2 is a block diagram showing the internal construction of the 1-chip microcomputer (hereinafter referred to as CPU) of the image processing apparatus. The portion encircled by a dotted line is the CPU which contains a successive comparison type A/D converter of 16 channels in an 8-bit microprocessor. These 16 analog inputs AN-1–AN16 are multiplexed in the chip by two multiplexers, an input is selected in accordance with the setting of an A/D channel mode register, and this selected analog input is digitalized by two A/D converters having the following construction.

Each A/D converter respectively comprises a sampling and holding circuit SH4 (or SH5), a voltage comparator 3 (or 4), a tap decoder 3 (or 4) and an SAR 3 (or 4). The SAR (successive approximation register) 3 (or 4), together with the tap decoder 3 (or 4), and a control 3 (or 4) for producing timing, constitutes a D/A converter.

The voltage comparator 3 (or 4) compares the differences between said sampled and held analog input and the voltage taps of the serial resistance string in the tap decoder 3 (or 4). This serial resistance string is connected between a terminal (not shown) for receiving an external reference voltage Vref for A/D and a ground terminal for A/D (not shown), and is constituted by 256 equivalent resistors for making the voltage between the two terminals into 256 equivalent voltage steps.

The voltage taps of the serial resistance string are selectively driven by an 8-bit shift register SAR 3 (or 4). The SAR 3 (or 4) sets by 1 bit each from the most significant bit (MSB) of the SAR 3 (or 4) until the output of the voltage tap of the serial resistance string becomes coincident with the analog input (that is, until the output of the comparator is inverted).

That is, with the start of A/D convertion, the (MAB) of the SAR 3 (or 4) is set, and ½ Vref of the voltage tap of the serial resistance string is selected and compared with the analog input. If the analog input is greater than ½ Vref, the MSB of the SAR 3 (or 4) is left as it is set, and if the analog input is smaller than ½ Vref, the MSB is reset. Subsequently, the bit next to the MSB is set and the voltage tap of the serial resistance string is rendered into ¾ Vref or ¼ Vref, which is compared with the analog input. The respective bits from the most significant bit to the least significant bit are compared with the voltage value selected by the SAR 3 (or 4) while being successively changed in this manner.

When the comparison between the 8 bits is completed, the SAR 3 (or 4) holds the digital value of the analog input and the result is latch-input to registers CR1–CR4 (CR5–CR8).

The A/D channel mode register, by its being set, can select analog inputs AN1–AN4 (and AN9–AN12) or AN5–AN8 (and AN13–AN16) at a 4-channel unit, and assuming that, for example, AN1–AN4 (AN9–AN12) have been selected, the analog inputs are selected and A/D-converted in the order of AN1 (AN9)→AN2 (AN10)→AN3 (AN11)→AN4 (AN12). The A/D-converted values of the respective inputs are stored in the order of CR1 (CR5)→CR2 (CR6)→CR3 (CR7)→CR4 (CR8).

When the four CR registers are completely supplied with the converted values, that is, when the 4-channel unit A/D conversion is completed, an internal interrupt requirement (hereinafter referred to as A/D interrupt) takes place. A priority order is provided between the interrupt on the CR1–CR4 side and the interrupt on the CR5–CR8 side, and even if two A/D interrupt requirements take place at a time, they will be processed in accordance with the priority order. The degree of priority is higher on the CR1–CR4 side.

The interrupt procedure in the control flows of FIGS. 5A to 5J which will later be described is such that the A/D conversion of the channels AN1–AN4 and AN9–AN12 is first started. Each A/D converter effects A/D conversion and, when there is A/D interrupt, processing of the channels AN1–AN4 stored in CR1–CR4 is effected and the A/D interrupt on the CR5–CR8 side is waited for. When the next A/D interrupt takes place, processing of the channels AN9–AN12 stored in CR5–CR8 is effected, whereafter the A/D conversion of AN5–AN8 and AN13–AN16 is started and processing similar to what has been described above is effected. In another method, the A/D conversions of the four pixels of the group of AN9–AN16 can be caused to overlap one another to thereby improve the total throughput during the time that the four pixels of the group of AN1–AN8 are image-processed.

Description will now be made of the components of the 8-bit microprocessor in the CPU. The components are an ALU (Arithmetic Logic Unit) for effecting operations, input ports $I_0$–$I_7$ and output ports $O_1$–$O_8$, for effecting the input-output interface from the outside (signals MOD1-8 are input to the input ports), a program memory storing therein a control program in which the control procedures processing procedures as shown in FIGS. 5A to 5J are written, a program counter for holding an instruction execution address, an instruction register for holding an instruction code indicated by the program counter, a high-speed internal register (the details of which will later be described) used when the microprocessor executes the instruction, a data memory which is a main memory capable of reading and writing, a PSW (Program Status Word) register for temporally saving the contents of various registers or the like during the interrupt or subroutine call, an internal bus, etc.

In the present embodiment, for example, 2K bytes is prepared as the capacity of the program memory and 256 bytes is prepared as the capacity of the data memory (RAM). By changing the data processing program in the program memory, it is possible to flexibly cope with various types of image processing. For example, by inputting external signals from the input ports of MOD1-8, it is possible to change the program in said program memory and change over the processed content from outside.

As the terminals of the CPU, there are AN1–AN16, $I_0$–$I_7$ (input ports), $O_1$–$O_8$ (output ports), and an INT terminal which is an external interrupt input, and as unshown terminals, there are power source terminals Vcc, Vss, AVcc (power source for A/D) AVss (GND for A/D), Vref (reference voltage input for A/D), RESET terminal, START signal terminal, STOP signal terminal, and X1, X2 (such as crystal connection terminals for oscillating contained clocks).

In the present embodiment, the interrupt signal from outside the CPU, for example, LA (Line Advance) signal obtained from a horizontal synchronizing signal in the sub scan direction of the input system, is input to the INT terminal.

Figure 3A:
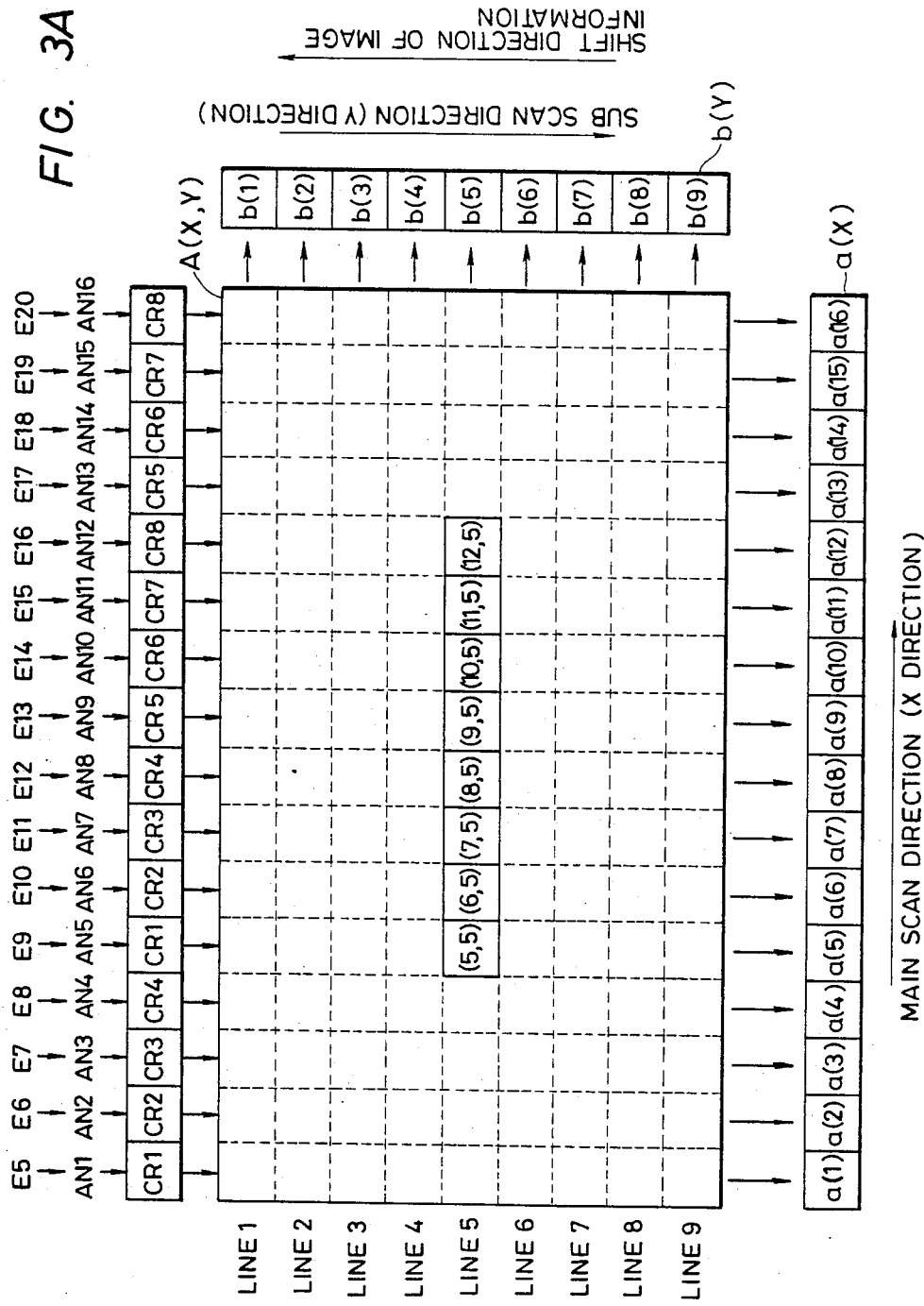
FIG. 3A shows the memory layout of the data memory in the CPU and the image signal inputting and processing system.

FIG. 3A shows the memory layout of image signals, etc. after A/D conversion stored in the data memory. The main stored signals are image signals A(X, Y) (X=1–16, Y=1–9), b(Y) (Y=1–9) which holds the sum of the density differences between adjoining pixels in the main scan direction, and a(X) which holds the sum of the density differences between adjoining pixels in the sub scan direction. X and Y are the X counter and Y counter in the register within the CPU which will later be described. Assuming that X direction is the main scan direction and Y direction is the sub scan direction, A(X, Y) is the image information in 16×9 memory map shown by coordinates (X, Y) and on the other hand, a(X)=Σ|A(X, Y)−A(X, Y−1)| and b(Y)=Σ|A(X, Y)−A(X−1, Y)|.

A(X,Y) in FIG. 3A is a memory map obtained when the control procedures of FIGS. 5A–5J have been executed in the state of the sensor cells, the sampling and holding circuit, the CPU and their wiring shown in FIG. 2. As will be seen from the contrast with FIG. 2, A(X, Y) (X=1–4, Y=1–9) is the image information of the sensor cells E5–E8, A(X, Y) (X=5–12, Y=1–9) is the image information of the sensor cells E9–E16, and A(X, Y) (X=13–16, Y=1–9) is the image information of the sensor cells E17–E20.

Figures 3B, 3C:
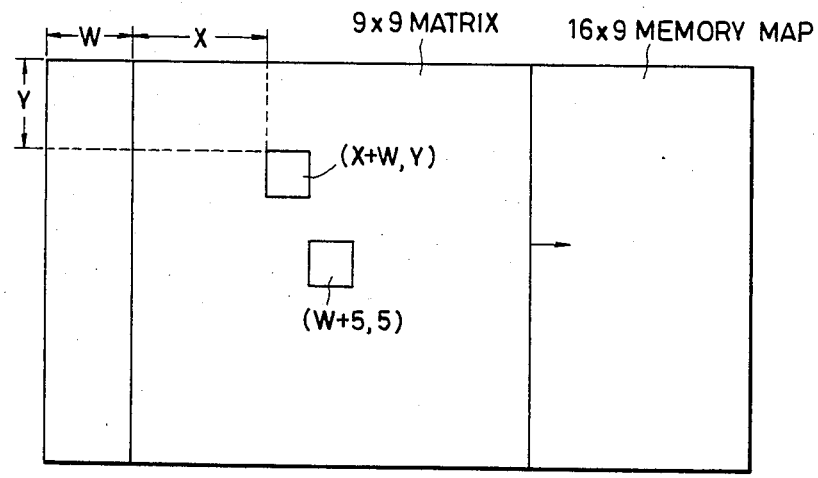
FIG. 3B shows the layout of the internal registers in the CPU.
FIG. 3C shows a method of image tone recognition in the data memory.

The image processing procedure shown in FIGS. 5A–5J is such that, as shown in FIG. 3C, A(X, Y) in 16×9 memory map is divided into 9×9 matrix, the image tone in the matrix is recognized and the central pixel (W+5, 5) (W=0–7) of the 9×9 matrix is binarized by a threshold value selected in accordance with the result of the recognition. If this 9×9 matrix is binarized by effecting image tone recognition while the matrix is successively shifted from the left end to the right end of 16×9 memory map (while W is varied), this CPU binarizes the image information of the positions of coordinates (5, 5), (6, 5),–(12, 5), i.e., the image information of the sensor cells E9–E16, while taking the image information E5–E8, E17–E20 of adjacent sensor arrays into consideration.

A plurality of such CPUs effect binarization while effecting image tone recognition in parallel and, when all the CPUs terminate the binarization of 1 line, the sensor cell advances by 1 line in the sub scan direction. At this time, the image information in the 16×9 memory map is shifted by 1 line in the sub scan direction (the direction of arrow). Newly A/D-converted image information is stored at the coordinates positions (1, 9)–(16, 9) of an empty line 9. Then, the aforementioned image tone recognition, binarization and line shift are repeated. Thus, the CPUs can accomplish the image tone recognition and binarization of the image information from E9–E16 two-dimensionally continuously over the main scan direction and the sub scan direction.

Since such binarization is effected by the plurality of CPUs at a time, the binarizing process is realized while image tone recognition is two-dimensionally effected on real time.

The description of FIG. 3C will now be supplemented. Assuming that the 9×9 matrix in the 16×9 memory map deviates by W pixels (W=0–7) from the left end, any image information coordinates in the 9×16 memory map are converted into an absolute position (X+W, Y) (X=1–9, Y=1–9), and the position of the central pixel binarized is (W+5, 5). As regards the shift of the 9×9 matrix, the variable W may be varied from 0 to 7.

FIG. 3B shows the layout of the internal register. Within the internal register, there are various registers of 8-bit width, counters and 1-bit flags. RES (result) register holds the result obtained by binarizing eight pixels (5, 5), (6, 5)–(12, 5) on the basis of T (threshold) register. Max register holds the maximum density value in the 9×9 matrix, and min register holds the minimum density value in the 9×9 matrix. BLC counter is a counter for selecting a threshold value from a threshold matrix (8×8) which will later be described, and assumes a value of 0–63. C register is a register for placing the aforementioned result of the binarization of eight pixels (5, 5), (6, 5),–(12, 5) into a predetermined position in the RES register.

F/FL (Flag for First Line completed) and F/OUT (Flag for Output) are flags for the image processing apparatus to distinguish the initial start time from the others in the control of the processing. That is, F/FL flag is for the distinction of the fact that the density difference between adjoining pixels in the sub scan direction cannot be found for the first line during the initial start, and on the other hand, F/OUT flag is for the distinction of the fact that the image tone recognition of the 9×9 matrix cannot be accomplished until all data are stored in the 16×9 memory map, but after that, the image tone recognition can be accomplished each time 1 line is A/D-converted.

Figure 4B:
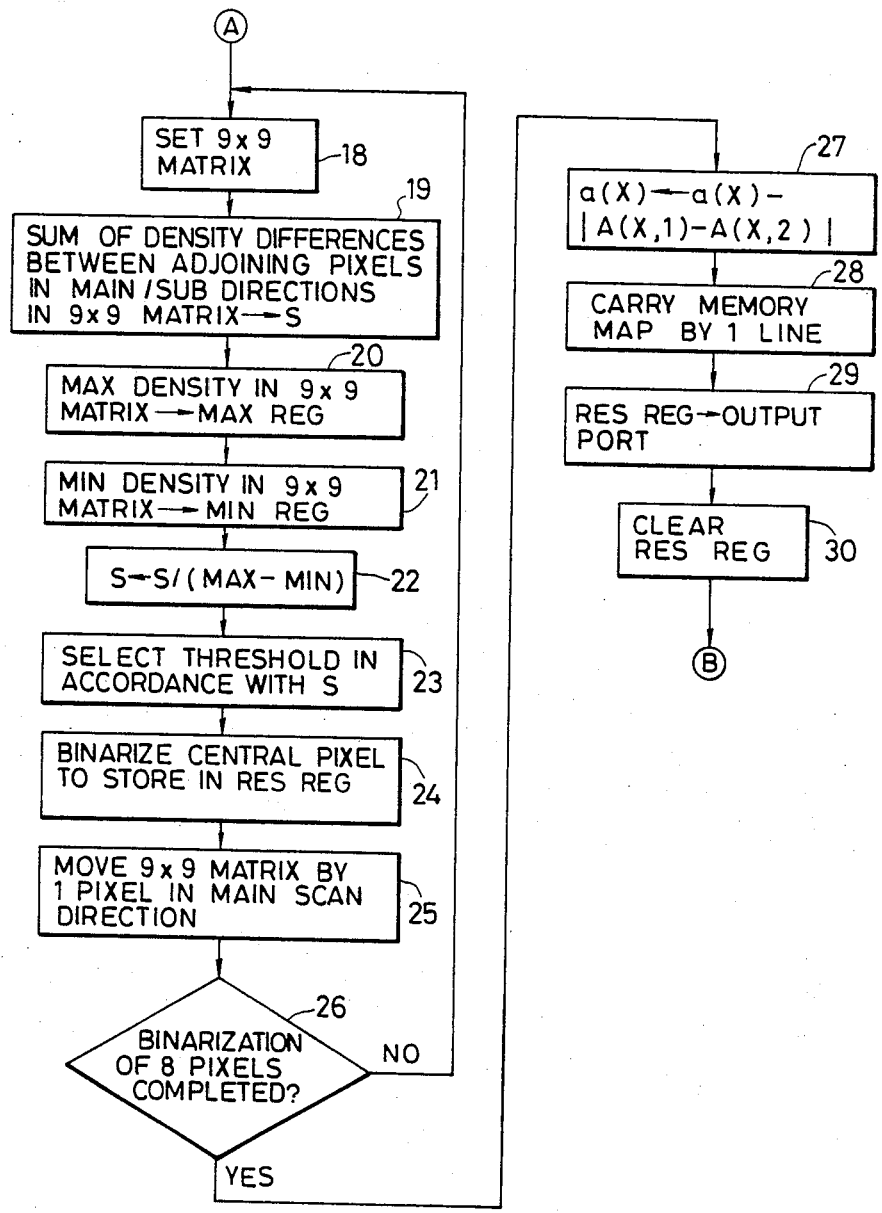
FIG. 4 is a flow chart schematically showing the image processing according to the method of an embodiment of the present invention.

FIG. 4 is a schematic flow chart at a macro level of the processing procedure in which the CPUs effect two-dimensional image tone recognition, select a threshold value and binarize it. Description will first be made of this schematic flow chart.

At step 10, AN1–AN16 of 1 line are A/D-converted and stored in the CR register, whereafter at step 11, the sum of the absolute values of the density differences between adjoining pixels in the main scan direction is stored in b(Y). At step 12, whether all the image information has been stored in the 16×9 memory map as previously described is judged. F/OUT flag is a flag for effecting image tone recognition for each line once the image information has been stored in the 16×9 memory map, because the 9×9 matrix of the present embodiment effects image tone recognition while shifting by a pixel each in the main scan direction and also effects image tone recognition while shifting by a line each in the sub scan direction. So, at first, the procedure proceeds to step 13, at which the sum of the density differences between adjoining pixels in the sub scan direction (the pixels of the preceding line) is integrated in a(X), and at step 14, the contents of the CR register (i.e., the image information of the A/D-converted line) are stored in the 16×9 memory map. The sensor cell advances by 1 line in the sub scan direction (step 15), and steps 10 to 16 are repeated until the storage for 9 lines is completed. When all the image information is stored in the 16×9 memory map, F/OUT flag is set (step 17).

Subsequently, the 9×9 matrix is set from the left end of the 16×9 memory map (step 18), and the sum of the density differences between adjoining pixels in the main and sub scan directions is integrated in a register S, not shown (at this time, the sum a(X) of the density differences between adjoining pixels in the sub scan direction is utilized) (step 19), and at steps 20 and 21, the maximum and minimum density values in the 9×9 matrix are found and stored in the max and min registers, respectively. At step 22, image tone recognition is effected on the basis of a formula. Where the interior of the 9×9 matrix is of the same density value, S/(max - min) is 0/0, but is regarded as O. At step 23, a threshold value is selected in accordance with the result of the image tone recognition, and at that threshold value, the central pixel of 9×9 is binarized and stored in the RES register (step 24). The 9×9 matrix is shifted in the main scan direction (step 25), and said operation is repeated until it is effected on the central pixel of 8 pixels (step 26).

When the binarization of 8 pixels is completed, the preparation for shifting the memory map 1 line by 1 line is made at step 27. That is, the density difference between the adjoining pixels of line 1 and line 2 is subtracted from a(X) (step 27). Then, the memory map is carried over by 1 line (step 28). The content of the RES register (the binary data of 8 pixels in charge of the CPU) is put out from the output port (step 29), the RES register is cleared (step 30), and the procedure returns to step 10.

Thereafter, each time 1 line is A/D-converted, the density difference between the image information thereof and line 8 is found and a(X) is renewed (step 31), and the image information concerned is stored in the 16×9 memory map of line 9 (step 32), and thereafter the aforedescribed image tone recognition and binarization are repeated.

The operation of the CPU will now be described in detail by reference to FIGS. 5A to 5J.

Figure 5A:
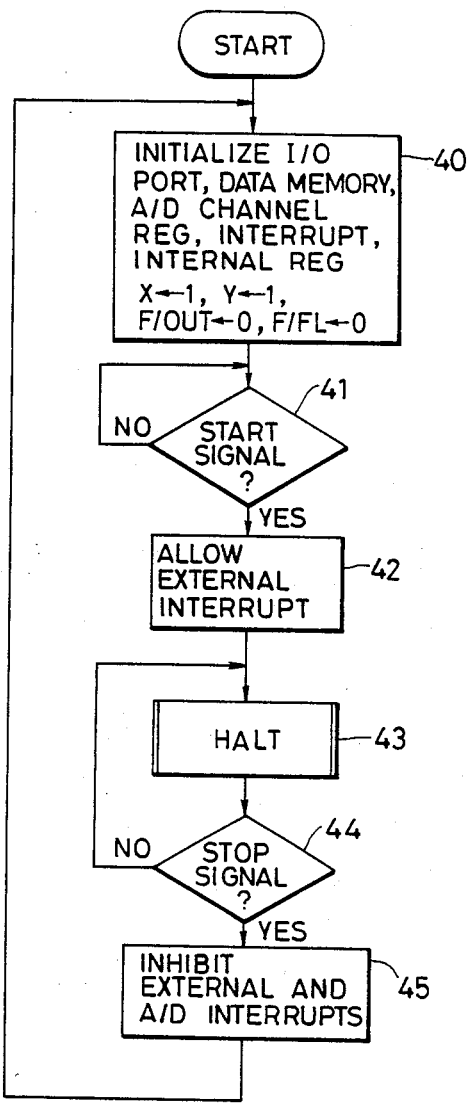
FIG. 5A is a main flow chart showing the image processing according to an embodiment of the present invention.

FIG. 5A shows the main flow of the processing program. At step 1, the CPU initializes the input/output port, the data memory, the A/D channel register and the interrupt, and at step 41, it waits for the START signal from outside. This START signal is the signal from other control means or the like for generalizing the entire CPU and provides the starting of the image input. Upon reception of this START signal, the CPU allows the interrupt at step 42, and halts the processing at step 43. This HALT state is released only by the program counter being incremented by a return instruction after the processing of the interrupts, or by RESET (signal or re-closing of the main switch). Accordingly, after the processing of the external interrupt (LA) or the A/D interrupt, the main flow proceeds to step 44. At step 44, whether the processing should be completed is judged and if there is no STOP signal, the main flow returns to step 43, at which the CPU again assumes the HALT state, and if there is STOP signal, the main flow proceeds to step 45. This STOP signal, like the aforementioned START signal, is supplied from other control means. At step 45, the external interrupt (LA) and the A/D interrupt are inhibited, whereafter the main flow returns to step 40, and the above-described processing is repeated.

Figure 5B:
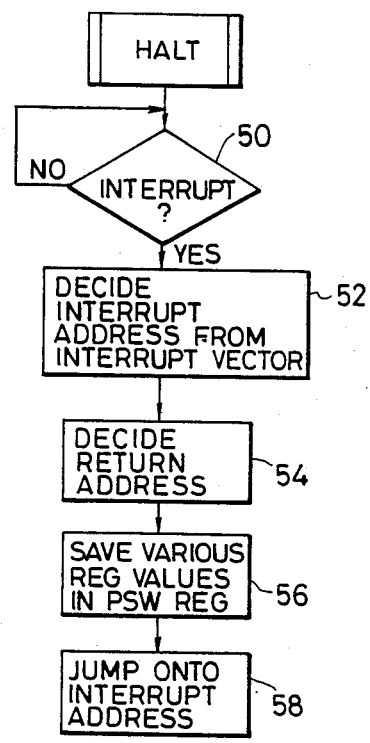
FIGS. 5B, 5C, 5D, 5E, 5F, 5G, 5H, 5I and 5J are flow charts showing the details of image processing.

FIG. 5B shows the flow of interrupt waiting and interrupt processing during the HALT. Accordingly, the interrupt waiting after the aforementioned external interrupt allowance or the A/D interrupt allowance to be described is effected at step 50 of FIG. 5B. First, at step 50, an interrupt is waited for. If there is an interrupt, whether that interrupt is by the external interrupt or by the A/D interrupt (there are four kinds of this interrupt as will later be described) is examined, and the interrupt address is decided from the interrupt vector (step 52).

Subsequently, at step 54, the return address is decided (in the present embodiment, step 44 is the return address), and at step 56, the various registers in the microprocessor and the return address are saved in PSW register so that the initial state can be restored even if the return is effected, and the flow jumps to said interrupt address (which, in the present embodiment, is step 60, 70, 100, 130 or 160 depending on the kind of the interrupt) (step 58).

Figure 5C:
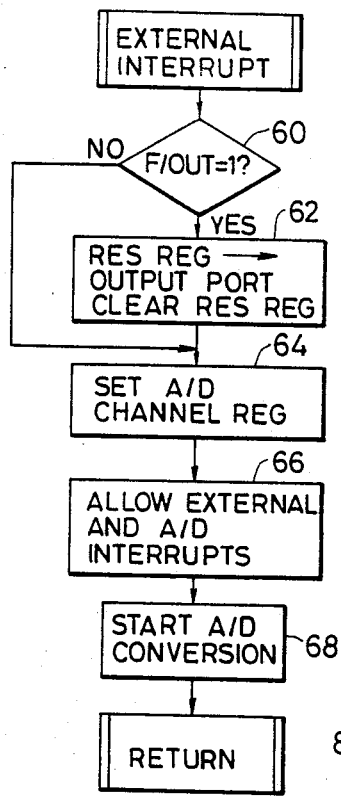

Reference is now had to the flow chart of FIG. 5C to describe the external interrupt processing routine by LA signal which provides the reference of the entire processing and is produced every 400 μsec. When the external interrupt takes place at step 50 (FIG. 5B), the flow jumps to an address shown in that interrupt vector address (in the present embodiment, step 60). At step 60, flag F/OUT is examined (this flag is a flag for indicating whether the first 9 lines after the aforementioned initial start have all been stored in the data map).

The fact that this flag is set at least indicates that the density data of all pixels are stored in the data map and the image processing up to the preceding line (in the present embodiment, the binarization of 8 pixels) is also completed and therefore, the flow proceeds to step 62, at which the register RES in which the image-processed 8-bit output data are stored is put out to the output port, whereafter the register RES is cleared and the flow proceeds to step 64. On the other hand, if the flag F/OUT is not set, it means that all data are not yet stored in the data map, and therefore the register RES is not put out and the flow directly proceeds to step 64.

At step 64, data for selecting channels An1–An4 and An9–An12 is imparted to the A/D channel register for setting the A/D conversion mode, and at step 66, the inhibition of the external interrupt (LA signal) and the A/D interrupt is released, and at step 68, an A/D start instruction for effecting A/D conversion in accordance with the content of the A/D channel register is supplied to the A/D converter, and the flow returns to the return address to which the external interrupt is applied, and waits for the A/D interrupt.

FIGS. 5D to 5J show A/D interrupt processing routines. The interrupt is applied four times within 400 μsec. of the reference signal LA and the timing thereof is for each A/D conversion of each four channels, that is, the first time=An1-An4, the second time=An9-An12, the third time=An5-An8 and the fourth time=An13-An16.

When the A/D interrupt takes place at step 50, the flow jumps to the address shown in the vector address, as previously described. This vector address is step 70 if the first time=An1-An4, step 100 if the second time=An9-An12, step 130 if the third time=An5-An8, and step 160 if the fourth time=An13-An16.

Description will hereinafter be made of the processing flow of the first 1 line, i.e., the A/D interrupt for beginning to store the first 1 line in the memory map. In the processing for the first 1 line, flags F/FL and F/OUT are of course reset. The A/D interrupt which takes place at first will be An1-An4.

When the interrupt of An1-An4 takes place, the flow jumps to step 70, and at steps 70 to 74, the absolute values of the differences between the registers CR1-CR4 in which the results of the A/D conversions of four channels An1-An4 are stored are found and stored in the data memory b(y). Subsequently, at step 76, the state of flag F/FL is examined, and this flag is not set for the first line and therefore, the flow proceeds to step 78. At step 78, the contents of the registers CR1-CR4 which store therein the pixel density of the current line are intactly stored into A(1, 1)-A(4, 1). It is because there is no preceding line relative to the first line that said contents are intactly stored. The flow then returns to step 50 and waits for the interrupt of the next An9-An12.

When the interrupt of An9-An12 takes place, the sum of the absolute values of the density differences between An9-An12 stored in CR5-CR8 is accumulated in the aforementioned b(y) at steps 100-104. The flow then proceeds from step 106 to step 108 and the densities of the pixels of An9-An12 are stored in A(9, 1)-A(12, 1). Subsequently, the flow proceeds to step 122, and the channels (5, 8)-(13, 16) are set in the A/D channel register and further, A/D conversion is started, and the flow returns to step 50 and waits for the next interrupt.

The next interrupt takes place from the channels 5-8. When this interrupt takes place, the absolute values of the density differences in the main scan direction are accumulated in b(y) at steps 130 to 134 as at the afore-described steps 100 to 104. At step 136, the flags are examined and the processing of the first line is not yet completed and therefore, the flow proceeds to step 138, at which the pixel densities of An5-An8 stored in CR1-CR4 are stored in A(5, 1)-A(8, 1), and the flow again returns to step 50 and waits for the interrupt from the channels 13-6.

When the A/D interrupt from the channels 13-16 takes place, the absolute values of the pixel density differences in the main scan direction are accumulated at steps 160 to 164, and at step 168, the pixel density of the first line is stored in A(13, 1)-A(16, 1). The flow then proceeds to step 200 of FIG. 5H. At this point of time, the absolute value of the density difference of the first line in the main scan direction is stored in b(y) and the pixel densities of An1-An16 are stored in A(1, 1)-A(16, 1). Since the other CPUs are also effecting the above-described operation at the same time, the pixel data over the entire 1 line is stored.

Subsequently, at step 200, y counter counts up by 1 in preparation for the next line. At step 202, whether the processing of 9 lines has been completed is examined, and the processing is not yet completed (NO), and therefore the flow proceeds to step 204, at which flag F/OUT is examined. It is for the following reason that after y=10 has been examined at step 202, flag F/OUT is examined at step 204. That is, if the storage of the data of 9 lines is completed (if y=10), counter y is returned to the initial value 1 at step 208 and further, at step 210, flag F/OUT is set. In the subsequent flow, the binarization of the central pixel is effected while the image tone recognition in the 16×9 memory is effected, but as a rule, for the tenth and succeeding lines, the image tone recognition and the binarization of the central pixel are effected at each 1 line and therefore, even if y≠10 at step 202, the flow proceeds to step 212 and subsequent steps, and for this reason, step 204 is provided.

Now, at step 204, the flag is examined, whereafter the flow proceeds to step 206, at which flag F/FL indicating that the storage of the data of the pixel of the first line has been completed is set, and the flow returns to step 50 to wait for the next external (LA signal) interrupt.

When the LA signal which is produced with the movement of the scanning system in the sub scan direction is again produced, the flow shifts from the interrupt processing flow of FIG. 5B to the external interrupt flow of FIG. 5C and the afore-described steps 60 to 68 are repeated to thereby start A/D conversion. Then, the interrupts from the channels 1-4 and the channels 9-12 are again waited for.

When the interrupt from the channels 1-4 takes place, the flow jumps to step 70, and steps 70 to 74 are repeated, whereafter the flow proceeds to step 76. Since flag F/FL is now set, the flow proceeds to step 80, at which the sum of the absolute values of the differences between CR1-CR4 storing therein the pixel density of the current line (the second line) and the pixel densities A(1, y−1)-A(4, y−1) of the preceding line (y−1) stored in the data memory, i.e., the absolute values of the density differences in the sub scan direction, is accumulated in a(1)-a(4). Subsequently, at step 88, flag F/OUT is examined and the processing of 9 lines is not yet completed (NO) and therefore, the flow proceeds to step 90, at which the s of the pixels of An1-An8 are stored in A(1, y)-A(4, y) corresponding to the current line indicated by the counter y, and then the flow returns to step 50 and waits for the interrupt from the next An9-An12.

When the interrupt from An9-An12 takes place, the process of accumulating the sum of the absolute values of the density differences in the main scan direction is effected at steps 100 to 104, and further, at step 106 and steps 110 to 116, the accumulation of the sum of theabsolute values of the density differences in the sub scan direction is effected, and at steps 118 and 120, the contents of CR5-CR8 in which the pixel density of the current line is stored are stored in A(9, y)-A(12, y) indicated by counter y. Then, at step 122, the A/D channel register is set to effect the A/D conversion of An5-An8 and An13-An16, and an A/D conversion start instruction for effecting the A/D conversion is executed in accordance with the content of this A/D channel register, and the flow returns to step 50 to wait for the interrupt from the channels (5-8).

Figure 5D:
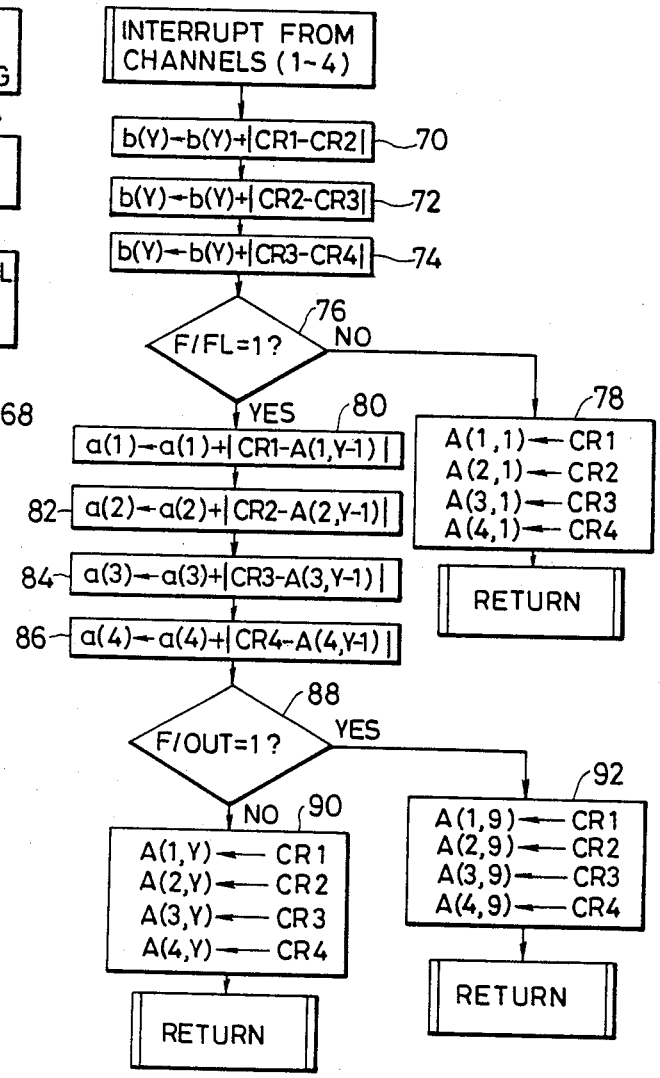
Figure 5E:
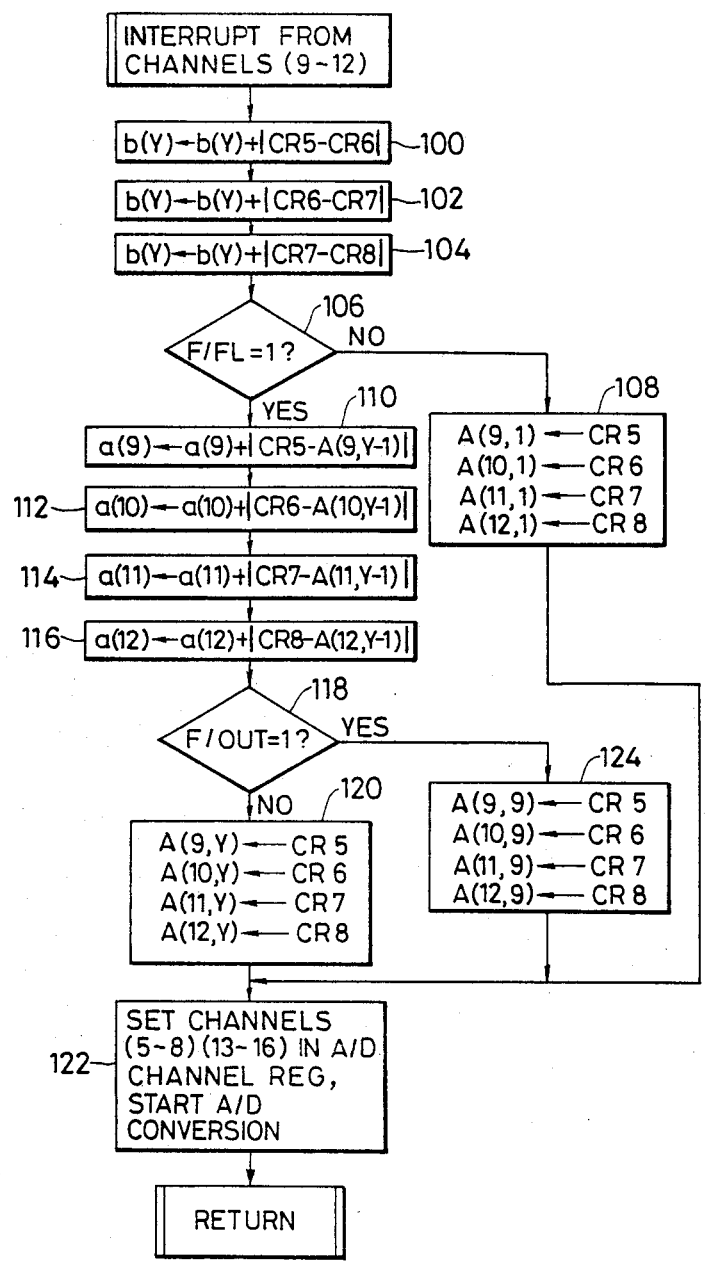
Figure 5F:
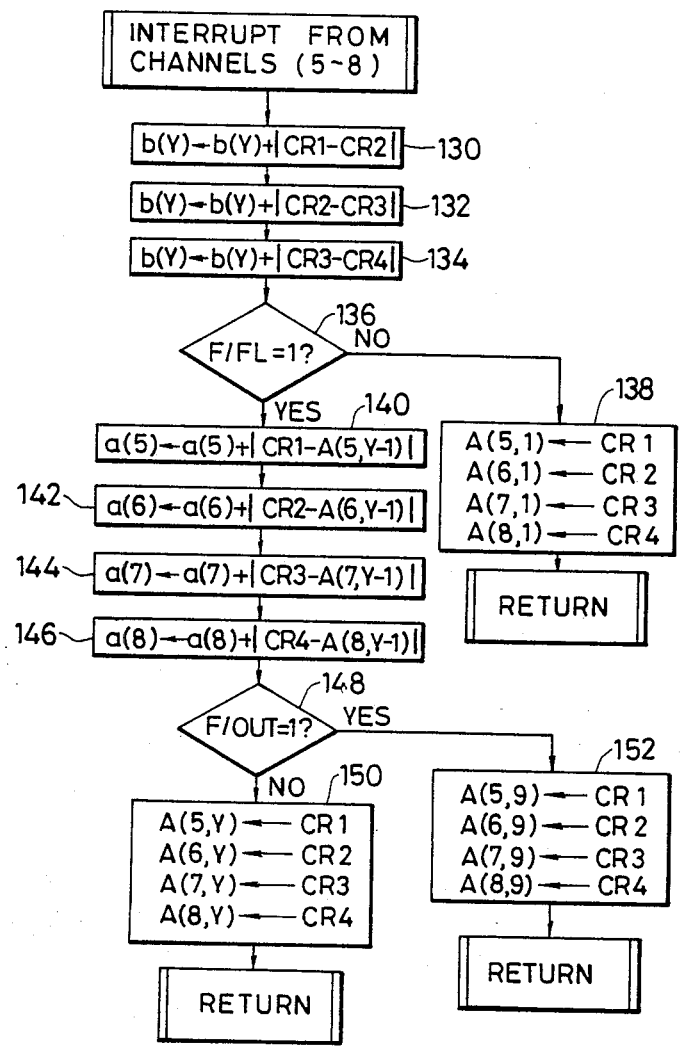
Figure 5G:
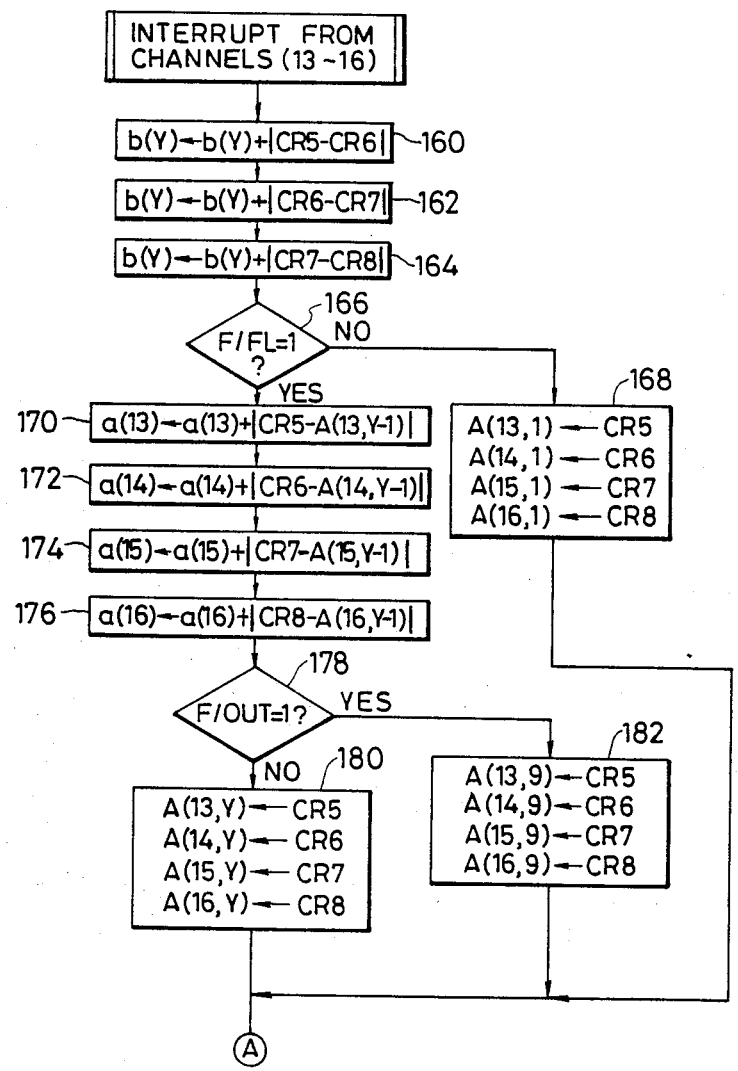
Figures 1, 5H:
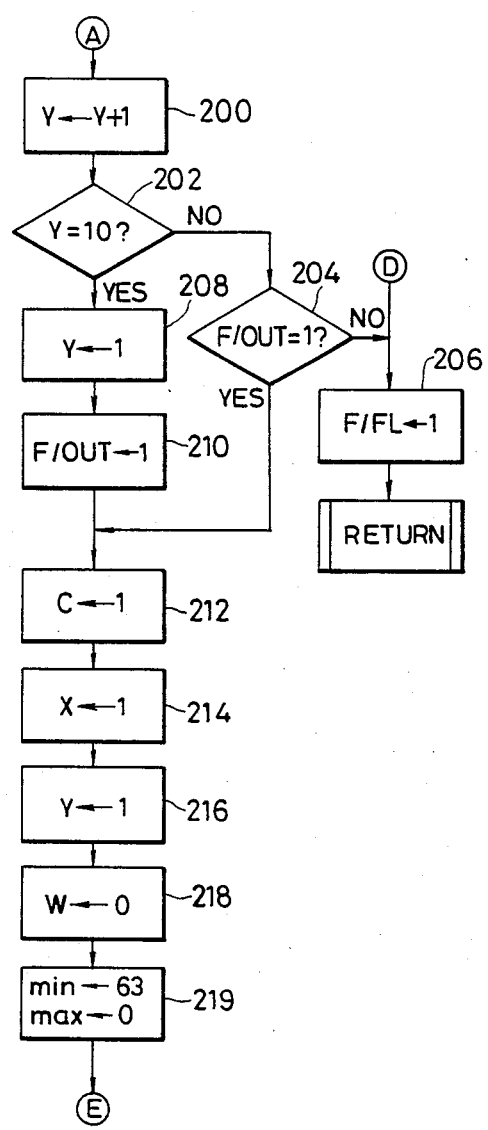
Figures 2, 5H:
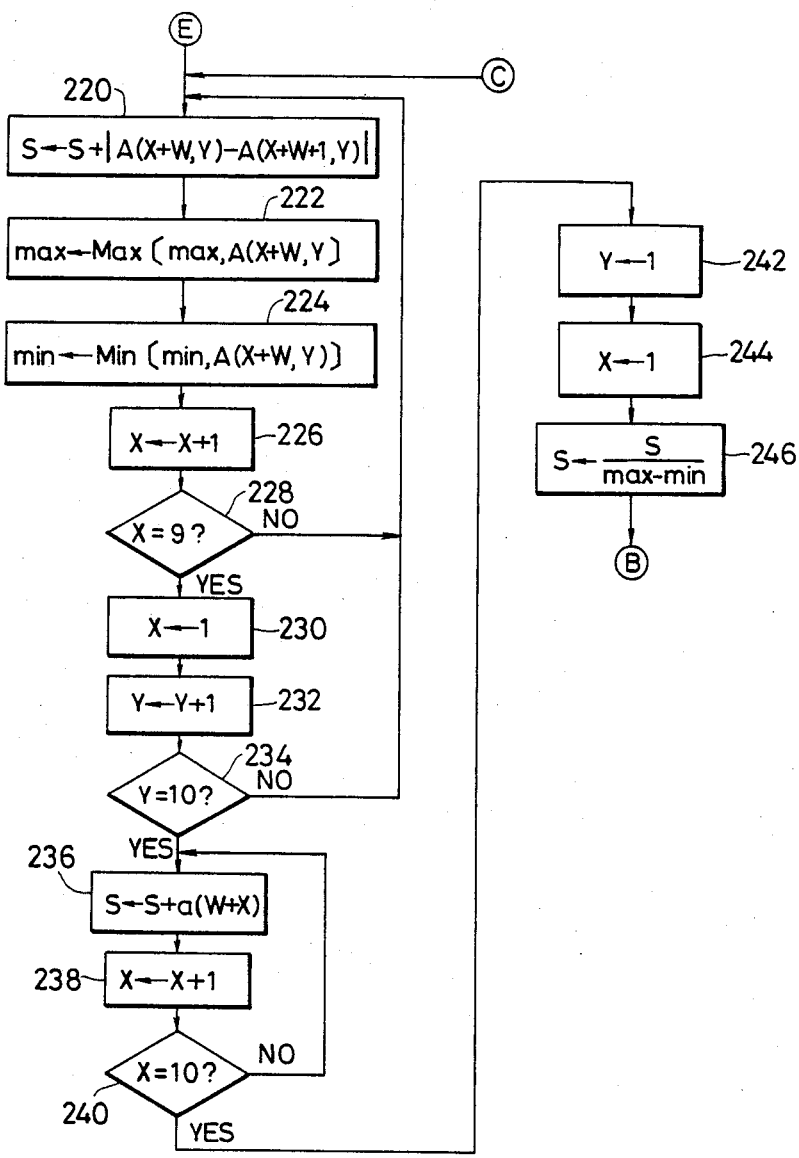

FIG. 5F shows the flow of processing of the interrupt from the channels (5-8). Also, FIG. 5G shows the flow of processing of the interrupt from the channels (13-16). The details of the processing are the same as the processing of the interrupts from the channels (1-4) and the channels (9-12) and therefore need not be described.

Subsequently, the flow returns to step 50 from step 200→step 202→step 204→step 206. Such flow shown in FIGS. 5C–5G is repeated until y=10 at step 202, that is, until all the pixel density information is stored in the memory map. When y=10 at step 202 after said repetition, y is returned to the initial value (y=1) at step 208, and at step 210, flag F/OUT indicating that the operation of the image processing thereafter and the outputting of the result thereof have also become possible is set, whereafter the flow proceeds to the image tone decision flow.

Subsequently, at step 212 and subsequent steps, the operation for image tone decision is effected, and the condition for this is after all of 144 pixel data of the first 9 lines (line 1– line 9)×(An1–An16) have been stored. That is, after the data of the first 9 lines have been stored, image tone decision is effected each time 16 pixels of 1 line are stored.

In the present embodiment, pixel decision becomes successively possible by using an image processing processor and therefore, it has become unnecessary to effect decision and outputting at a block unit each time 4×4 or 8×8 blocks shift as has heretofore been effected on hard logic. Therefore, with the 8 pixels (encircled by solid line) of (5, 5)–(12, 5) of line 5 of the memory map shown in FIG. 3A as the object, the block of 9×9 pixels centering around each of the 8 pixels is processed in a predetermined manner and binarization is effected by a threshold value suitable for the pixel concerned.

The counter, etc. used in the following flow will now be again described by reference to FIGS. 3B and 3C. The range in which image tone recognition is done is the 9×9 matrix of FIG. 3C. The counter w is varied so that this matrix can move in 16×9 memory map. Also, the pixels in the 9×9 matrix are designated by $(x+w, y)$ as shown in FIG. 3C. $(w+5, 5)$ is the central pixel position at which binarization is effected. The counter c is a counter for designating the bit position in RES register. Also, max register and min register are registers for holding the maximum and minimum densities, respectively, in 9×9, and their initial values are 0 and 63, respectively. The max register may assume a value of 0–63. Originally, because of 8-bit A/D conversion, the range thereof should be 0–255, but for the reason that the processing capacity becomes great and that there is little or no influence imparted to the image even if the image is processed by the six most significant bits of 8 bits, the decision is all within the range of 0–63 of the six most significant bits.

Image tone recognition will now be described. At steps 212–219, counters c, x, y, w and registers min and max are initialized. At this point of time, 9×9 matrix is at the left end of 16–9 memory map.

Subsequently, steps 220–228 are repeated until the counter x assumes 9 (until it goes to the right end of the 9×9 matrix), and the accumulated value of the absolute value $|A(x+w, y)-A(x+w, y)|$ of the density difference between adjoining pixels in 9×9 in the main scan direction is stored in the register S, and the maximum density value in the main scan direction in 9×9 is stored in the register max, and the minimum density value in the main scan direction in 9×9 is stored in the register min.

Then, the counter x is returned to 1 (step 230), and the counter y is counted up and steps 220–234 are repeated until y=10. Thus, the accumulated value, the maximum value and the minimum value of all 9 lines are stored in the registers S, max and min, respectively.

The flow repeated till the next steps 236–240 is a flow in which the aforementioned accumulated value a(x) of the density difference in the sub scan direction is added to the register S. As a result, the sum of the density differences between adjoining pixels in the main and sub scan directions in 9×9 is stored in the register S.

Figure 5I:
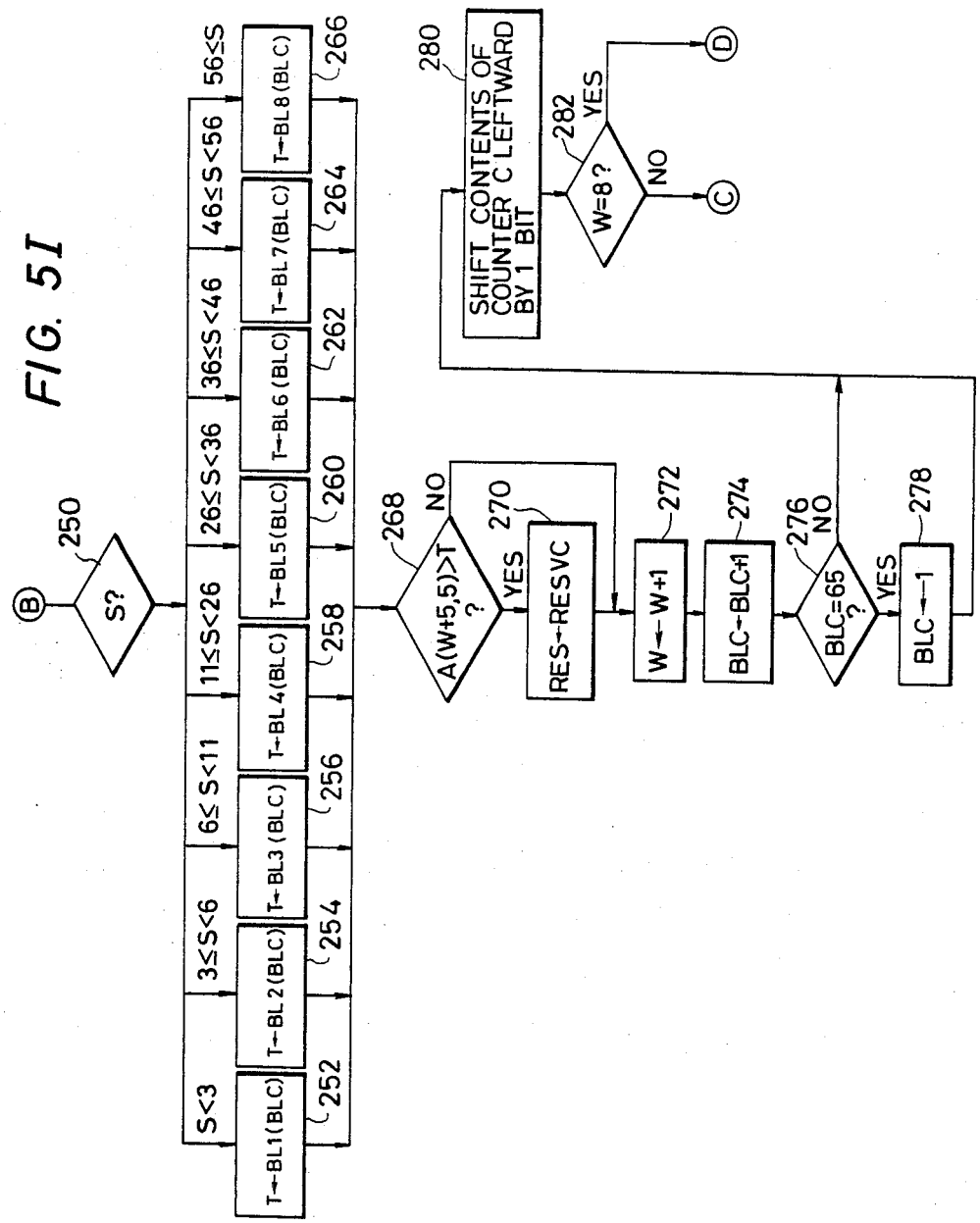
Figure 5J:
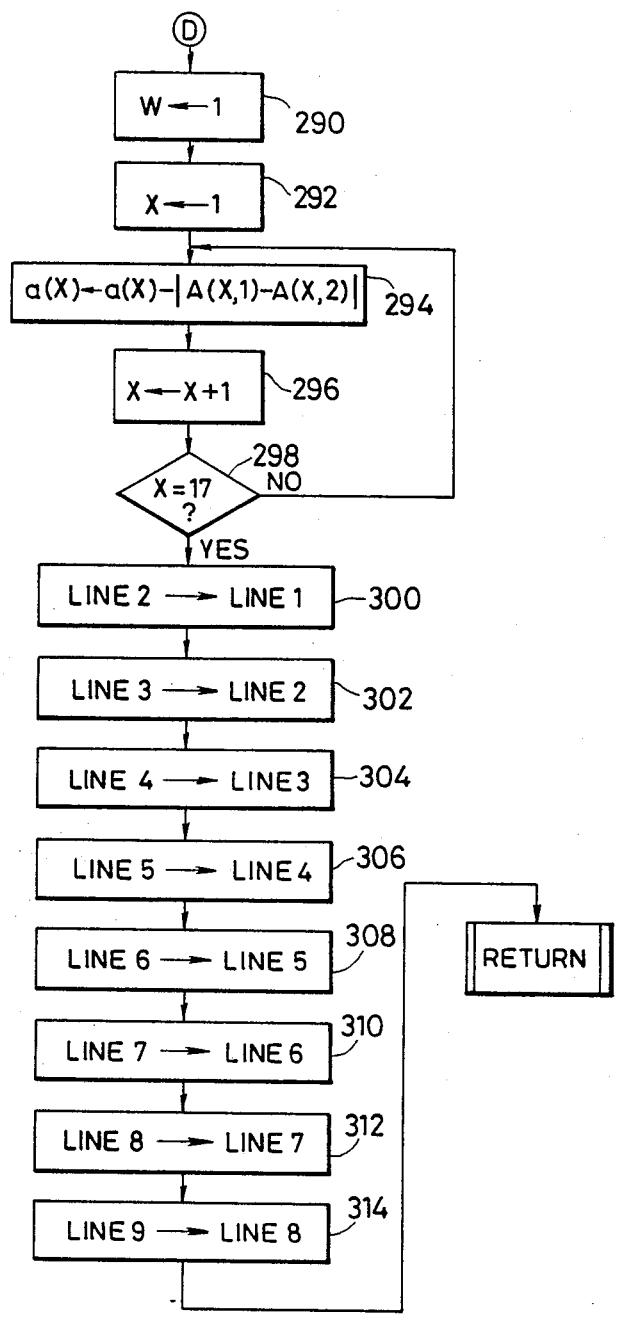

At steps 242 and 244, the counters x and y are returned to their initial values, and at step 246, the content of the register S is divided by the register max minus the register min and the quotient is stored in the register S. This quotient should reflect the image tone in 9×9 and the threshold value of binarization may be chosen in conformity with this number. The steps 250–266 of FIG. 5I are the flow in which this threshold value is chosen. The chosen threshold value is stored in a register T.

As regards the threshold value, one of matrix BL (block) 1 to matrix BL8 is chosen in conformity with the value of S, as shown in FIGS. 7A–7H. Each BL is 8×8 matrix and a threshold value thereof is chosen in conformity with the value of a counter BLC. The counter BLC may assume a value of 1–64 and therefore, by varying the value of the counter BLC in succession, the central pixel of 9×9 pixels is binarized by an optimum threshold value while continuous image tone recognition of the block of 9×9 pixels is effected.

At step 268, the density value $A(w+5, 5)$ of the central pixel $(w+5, 5)$ and the register T are compared with each other for binarization. If the density of the pixel is greater than the threshold value, the logical Or of the register RES and the counter c is taken at step 270. The function of the counter c is to store the result of the binarization at a predetermined bit position of the 8-bit register RES because there are eight desired pixels.

When the result of the binarization is stored in the register RES, the counter w is counted up by 1 at step 272. By the counter w being counted up, 9×9 matrix can be moved in the 16×9 memory map.

The loop of steps 274–278 is a flow for counting up the counter BLC in succession.

At step 280, the content of the counter c is shifted leftwardly by 1 bit. Accordingly, the value of C becomes one of 1, 2, 4, 8, 16, 32, 64 and 128. Thus, at step 270, the result of the binarization can be stored in the register RES with the bit position shifted in succession. At step 282, whether the content of the counter w has become equal to 8 is examined, and step 220 and subsequent steps are repeated until all of the 8 central pixels are binarized, and the result of the binarization is stored in the register RES.

Subsequently, at steps 290 and 292, initialization of the counters x and w is effected. Further, at step 294, the density difference $|A(x, 1)-A(x, 2)|$ between adjoining pixels of the first and second lines in the sub scan direction is subtracted from a(X) and this is effected on all of the pixels in the main scan direction in order that at steps 300–314, the data stored in the 16×9 memory map may be shifted upwardly by 1 line in succession. By doing so, the pixel density differences of line 2 to line 9 in the sub scan direction are stored in each a(X).

So, at steps 300–314, the interior of the memory map is shifted in succession. Accordingly, the ninth line in the memory map becomes empty and the storage of the data by the scanning of the next line becomes possible. Then, at step 316, the flow returns to the return address to wait for the next external interrupt.

The process until the binarization of the first 9 lines is completed by the flow of steps 212–314 has been described above. At this point of time, the result of the binarization of the desired pixel in the 16×9 memory map is stored in the register RES, and the pixel density data of the preceding 8 lines are stored in the first to eighth lines of the 16×9 memory map.

Accordingly, when the scanning means is moved by 1 line in the sub scan direction and the next external interrupt takes place, the flow goes to step 60 of FIG. 5C, and since flag F/OUT is set, outputting is effected from the register RES at step 62, and the aforedescribed flow for the next line is repeated.

Thereafter, flag F/OUT remains set and therefore, at step 88 of FIG. 5D, step 118 of FIG. 5E, step 148 of FIG. 5F and step 178 of FIG. 5G, the flow proceeds to step 92, step 124, step 152 and step 182, respectively, and the pixel densities stored in the CR register are successively stored into the ninth line of the memory map. Thus, thereafter, each time 1 line is read, the image tone recognition and binarization in the 9×9 matrix are effected.

The output from the register RES is temporally held in the shift register SR of FIG. 1 and is successively serially put out from the concatenated shift register SR. Thus, the parallel-processed image signal is subjected to image tone recognition and binarized on real time.

The above-described image tone recognition method is a method whereby image tone recognition is effected while the central pixel is shifted by 1 pixel each, but of course, the same effect may also be obtained by dividing the 16×9 memory map into blocks of the size of a threshold matrix and binarizing each block by the threshold matrix. Again in this case, the image signal in charge of the adjacent CPU is introduced and therefore, non-conformity between the CPUs does not occur and higher speed image processing becomes possible.

Description will now be made of the matrices BL1–BL8 shown in FIGS. 7A–7H.

BL1 (FIG. 7A): This is a dot concentration type matrix in which importance is attached to the color tone representation. The range of the threshold value is 32 tones of 2–62 and the output form is 2 dots/8×8.

BL2 (FIG. 7B): This is a dot concentration type matrix in which importance is attached to the color tone representation and resolution is also value is 32 tones of 2–62 and the output form is 4 dots/18×8.

BL3 (FIG. 7C): This is a dither processing matrix in which resolution is taken into consideration and contrast is emphasized. The range of the threshold value is 17 tones of 16–48 and the output form is 4 dots/8×8.

BL4 (FIG. 7D): This is a matrix by a predetermined threshold value (32). 2 tones are provided by a binarizing process.

BL5 (FIG. 7E): This is a dither processing matrix in which, as in BL3, resolution is taken into consideration and contrast is emphasized. The range of the threshold value is 17 tones of 16–48 and the output form is 4 dots/8×8.

BL6 (FIG. 7F): This is a dither processing matrix comprising a small matrix which is the object of a netpoint original. The range of the threshold value is 5 tones of 20, 28, 36 and 44 and the output form is 16 dots/8×8.

BL7 (FIG. 7G): This is a matrix in which the phase of BL6 is changed by 90° with a view to suppress moire.

BL8 (FIG. 7H): This is a matrix in which the phase of BL6 is changed by 180° with a view to suppress moire.

By using the above eight kinds of matrices properly in conformity with the image tone, it becomes possible to endow the reproducibility of half tone, characters and net points with linearity.

Figure 8:
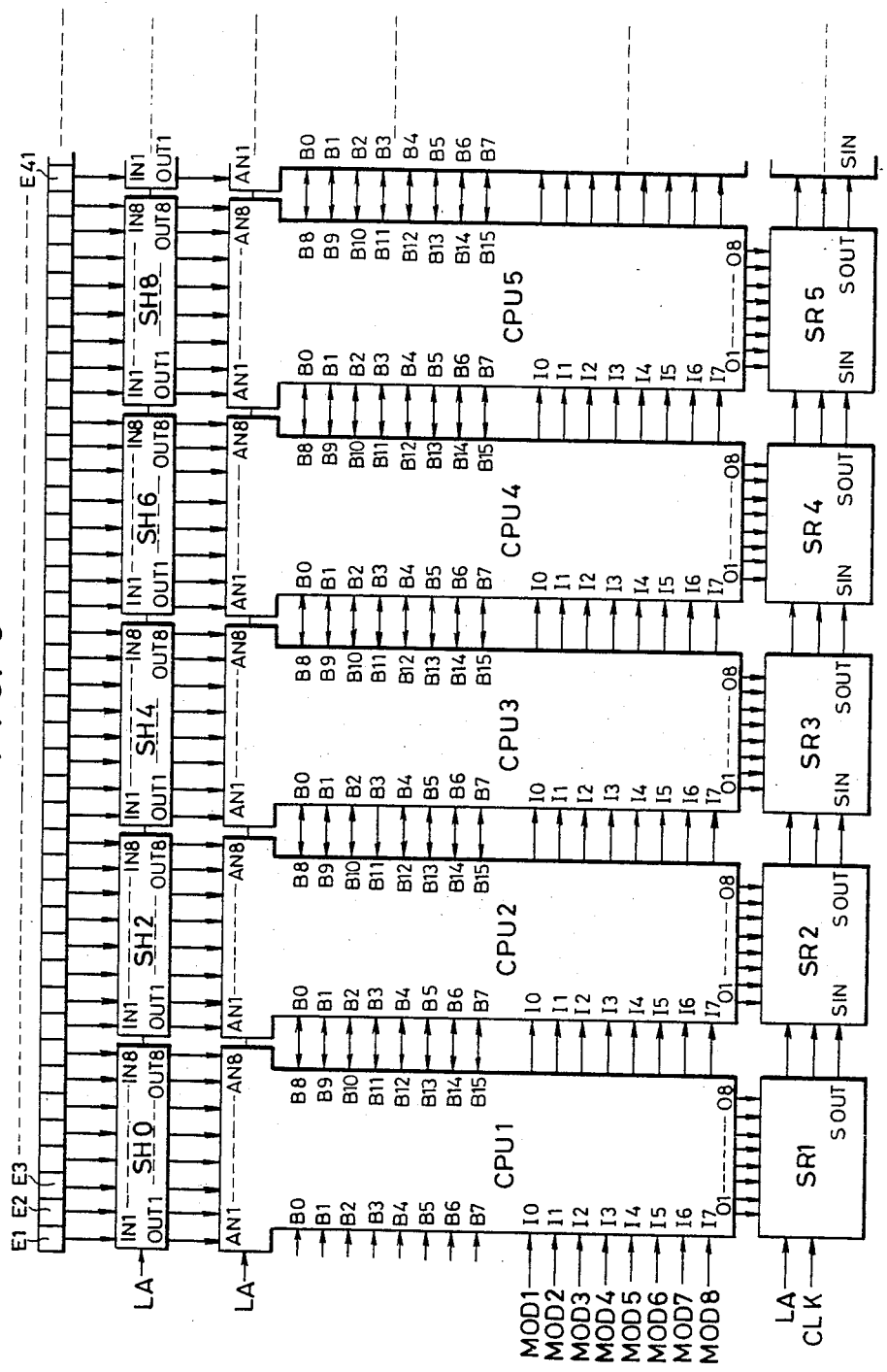
FIGS. 8 and 9 show another method of coupling between CPUs.
Figure 9:
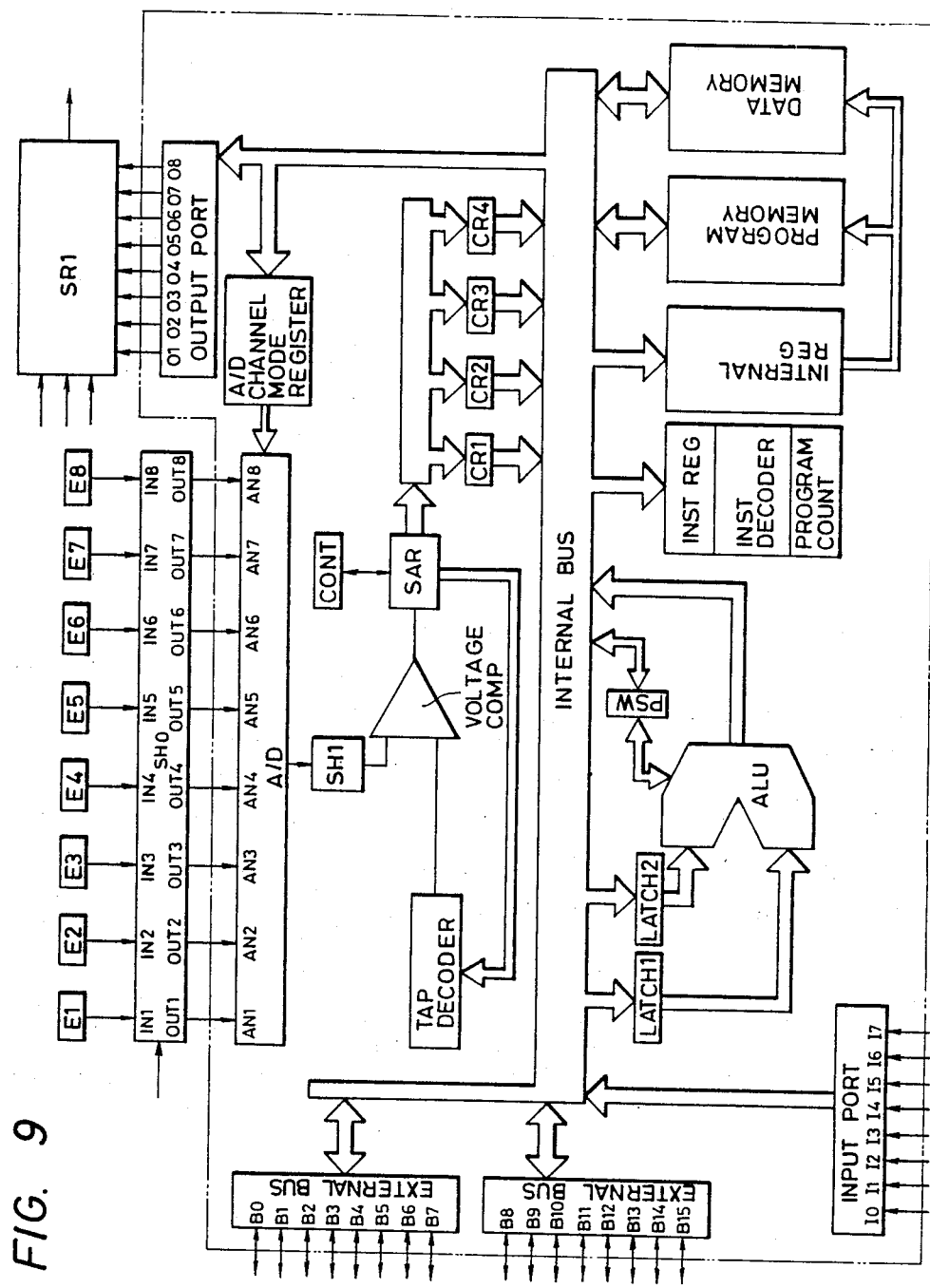
Figure 10:
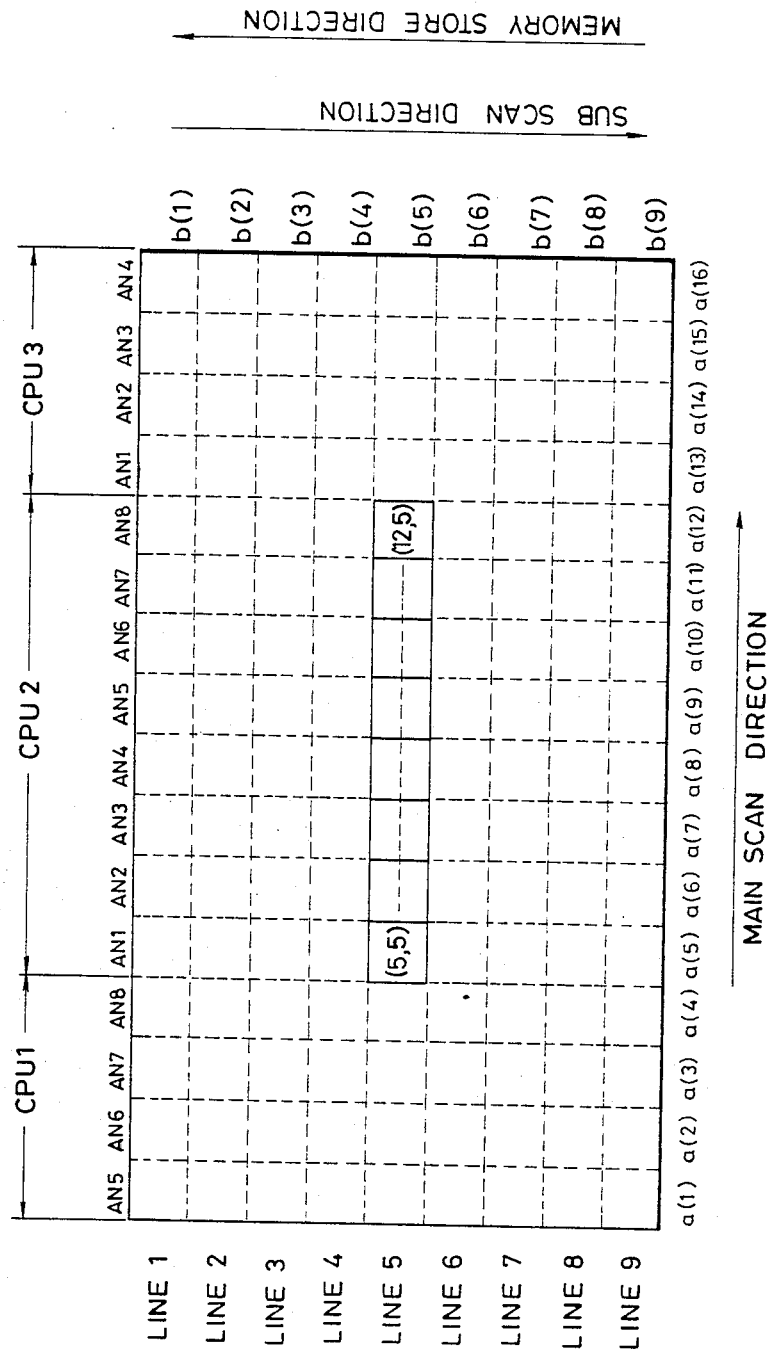
FIG. 10 shows the input system when image information is input by another method of coupling.

FIGS. 8 and 9 show another embodiment of the CPU. In the CPU shown in FIGS. 1 and 2, the image signal from the adjacent CPU has been introduced into the A/D converting portion, but in this embodiment, the pixel density A/D-converted by the adjacent CPU is introduced through external buses B0–B15. By doing so, there is also obtained the memory map as shown in FIG. 10.

As described above, according to the image processing apparatus of the present invention, a plurality of image processing means effect image processing in parallel, whereby high-speed image processing becomes possible.

Also, according to another embodiment of the present invention, input means such as sensor cells and image processing means can be arranged on the same base plate and thus, compactness of the apparatus is achieved.

Also, the respective image processing means each having an A/D converting portion therein start A/D conversion and effect image processing substantially simultaneously with the sample signal obtained in synchronism with the main scanning and therefore, high-speed two-dimensional image processing becomes possible.

Further, according to an embodiment of the present invention, by changing the program of the imaging processing procedure stored in memory means, a variety of two-dimensional image processings become possible.

Furthermore, individual image processing means receive as an input a part of the image signal in charge of the adjacent image processing means, whereby non-conformity of image processing does not occur.

The present invention is not restricted to the above-described embodiments, but various applications and modifications thereof may be made within the scope of the invention as defined in the appended claims.

What is claimed is:

1. An image processing apparatus comprising:
    image signal generation means for generating, in parallel digital image signals having a plurality of pixels;
    division means for dividing the digital image signals generated in parallel by said image signal generating means into a plurality of blocks; and
    a plurality of image processors for parallel-processing by block the divided digital image signal,
    each of said plurality of image processors being connected for receiving, an an input for processing both the digital image signal of the pixel to be parallel-processed and the digital image signal of the pixel adjacent the pixel to be parallel processed.

2. An image processing apparatus according to claim 1, further comprising:
    output means for outputting processing results of said plurality of image processors,
    wherein said output means has converting means for converting the processing result of said image processors from parallel into series.

3. An image processing apparatus according to claim 1, wherein each of said image processors has an operation control portion, a first memory portion for storing therein digital image information converted by an analog to digital converting portion, and a second memory portion for storing therein a procedure for two-dimensionally image-processing said digital image information and a control procedure for controlling said operation control portion and said first memory portion.

4. An image processing apparatus according to claim 1, wherein said image signal generating means comprises reading means for reading an original image.

5. An image processing apparatus according to claim 4, wherein said reading means includes a photoelectric converting portion, said plurality of image processors and said converting means being arranged on one base plate.

6. An image processing apparatus comprising means for dividing a read image signal from a reading sensor into m blocks, and m image processors each for receiving as an input a read image signal for each of said divided blocks and for parallel-image-processing each said read image signal the nth image processor being connected for receiving as inputs, in addition to the read image signal of the nth block, a read image signal for several pixels each of which adjoins and is continuous to the nth block, out of the read image signal of the (n−1)th block and the read image signal of the (n+1)th block, respectively, where $1 \leq n \leq m$.

7. An image processing apparatus according to claim 6, wherein each said image processor comprises a monolithic integrated circuit having input terminals on the four sides thereof, said dividing means is a wiring pattern to said integrated circuit, the read image signal of the corresponding block of said image processor is input to a terminal on one of said four sides which is not opposed to the remaining sides, and the read image signal from each adjacent block is input to terminals on two of said four sides which are opposed to each other.

8. An image processing apparatus according to claim 6, wherein each said image processor comprises a monolithic integrated circuit having input terminals on the four sides thereof, said dividing means is a wiring pattern to said integrated circuit, and the read image signal of the corresponding block of each said image processor and the read image signal from each adjacent block are input to terminals on two of said four sides which are opposed to each other.

9. An image processing apparatus comprising image reading sensors arranged in a row in a main scan direction, samples signal output means for producing a sample signal while relatively moving a read image in a direction orthogonal to the row of said image reading sensors, and a plurality of image processors for divisionally receiving the image information from said sensors as an input and for image-processing the image information, each of said image processors having therein an analog to digital converting portion for digitalizing outputs of said reading sensors and a processing portion for processing a digitalized image signal, each of said image processors including said analog to digital conerting portion and said processing portion being on a single chip, and starting analog to digital conversion substantially at one time in accordance with said sample signal.

10. An image processing apparatus according to claim 9, wherein each said image processor comprises a monolithic integrated circuit having an operation control portion, a first memory portion for storing therein digital image information converted by the analog to digital converting portion, and a second memory portion for storing therein a procedure for two-dimensionally image-processing said digital image information and a control procedure for controlling said operation control portion and said first memory portion.

11. An image processing apparatus according to claim 10, wherein the image processing procedure divides the digital image information stored in said first memory portion into blocks, recognizes the image tones of said divided blocks and binarizes the central pixel of said blocks on the basis of the result of the image tone recognition.

* * * * *

UNITED STATES PATENT AND TRADEMARK OFFICE
CERTIFICATE OF CORRECTION

PATENT NO. : 4,786,820

DATED : November 22, 1988

INVENTOR(S) : YOSHITAKA OGINO, ET AL.    Page 1 of 3

It is certified that error appears in the above-identified patent and that said Letters Patent is hereby corrected as shown below:

COLUMN 3

Line 60, "real time" should read --real-time--.

COLUMN 4

Line 2, "is" should read --as--.

COLUMN 6

Line 3, "A/D convertion," should read --A/D conversion,-- and "(MAB)" should read --(MSB)--.

COLUMN 7

Line 5, "temporally" should read --temporarily--.
    Line 22, "A/D) AVss" should read --A/D), AVss--.

COLUMN 9

Line 58, "step 1," should read --step 40,--.

COLUMN 11

Line 52, "channels 13-6." should read --channels 13-16.--.

UNITED STATES PATENT AND TRADEMARK OFFICE
CERTIFICATE OF CORRECTION

PATENT NO. : 4,786,820

DATED : November 22, 1988

INVENTOR(S) : YOSHITAKA OGINO, ET AL.

It is certified that error appears in the above-identified patent and that said Letters Patent is hereby corrected as shown below:

COLUMN 12

Line 25, "afore-described" should read --aforedescribed--.
Line 42, "s" should read --densities--.
Line 51, "theab-" should read --the ab- --.

COLUMN 13

Line 57, "$|A(x+w, y)-A(x+w, y)|$" should read --$|A(x+w, y)-A(x+w+1, y)|$--.

COLUMN 15

Line 21, "temporally" should read --temporarily--.
Line 44, "also value" should read --also taken into consideration. The range of the threshold value--.

COLUMN 16

Line 44, "allel" should read --allel,--.

UNITED STATES PATENT AND TRADEMARK OFFICE
CERTIFICATE OF CORRECTION

PATENT NO. : 4,786,820

DATED : November 22, 1988

INVENTOR(S) : YOSHITAKA OGINO, ET AL.   Page 3 of 3

It is certified that error appears in the above-identified patent and that said Letters Patent is hereby corrected as shown below:

COLUMN 17

Line 17, "signal" should read --signal,--.

COLUMN 18

Line 6, "samples" should read --sample--.

Signed and Sealed this

Eighth Day of May, 1990

*Attest:*

HARRY F. MANBECK, JR.

*Attesting Officer*    *Commissioner of Patents and Trademarks*